US009709838B2

(12) United States Patent
Jung et al.

(10) Patent No.: US 9,709,838 B2
(45) Date of Patent: Jul. 18, 2017

(54) TILED DISPLAY AND BEZELLESS LIQUID CRYSTAL DISPLAY APPARATUS

(71) Applicant: SAMSUNG ELECTRONICS CO., LTD., Suwon-si (KR)

(72) Inventors: Jong-hoon Jung, Suwon-si (KR); Young-mok Park, Asan-si (KR); Dae-sik Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/590,547

(22) Filed: Jan. 6, 2015

(65) Prior Publication Data

US 2015/0277173 A1 Oct. 1, 2015

Related U.S. Application Data

(60) Provisional application No. 61/970,489, filed on Mar. 26, 2014.

(30) Foreign Application Priority Data

Aug. 7, 2014 (KR) .......................... 10-2014-0101785

(51) Int. Cl.
*G02F 1/1333* (2006.01)
*G02F 1/1335* (2006.01)

(52) U.S. Cl.
CPC .... *G02F 1/13336* (2013.01); *G02F 1/133308* (2013.01); *G02F 1/133603* (2013.01)

(58) Field of Classification Search
CPC .................................................. G02F 1/13336
See application file for complete search history.

(56) References Cited

U.S. PATENT DOCUMENTS

| | | | | |
|---|---|---|---|---|
| 5,867,236 | A * | 2/1999 | Babuka ................. | G09F 9/3026 349/153 |
| 6,249,329 | B1 * | 6/2001 | Dabral ................. | G02F 1/1339 349/73 |
| 6,456,354 | B2 * | 9/2002 | Greene ............... | G02F 1/13336 349/153 |
| 6,757,043 | B2 | 6/2004 | Deane | |

(Continued)

FOREIGN PATENT DOCUMENTS

| | | |
|---|---|---|
| JP | 3946547 B2 | 7/2007 |
| JP | 5047071 B2 | 10/2012 |

(Continued)

*Primary Examiner* — Phu Vu
(74) *Attorney, Agent, or Firm* — Sughrue Mion, PLLC

(57) ABSTRACT

A tiled display includes a plurality of bezelless liquid crystal display (LCD) panels in which pixels are exposed from at least one of a top side, a bottom side, a left side, and a right side thereof; at least one backlight unit disposed below the plurality of bezelless LCD panels and configured to emit light. The plurality of bezelless LCD panels are disposed such that sides from which the pixels are exposed are connected to each other, the backlight unit comprises a plurality of light emitting diodes (LEDs) configured to emit the light to the bezelless LCD panel, and the plurality of LEDs are disposed at equal intervals below the plurality of bezelless LCD panels including a portion where the plurality of bezelless LCD panels are connected to each other.

20 Claims, 40 Drawing Sheets

(56) References Cited

U.S. PATENT DOCUMENTS

| | | | |
|---|---|---|---|
| 7,545,461 B2* | 6/2009 | Kondo | G02B 6/0085 349/58 |
| 8,093,812 B2 | 1/2012 | Makino et al. | |
| 8,305,294 B2* | 11/2012 | Cok | H01L 27/3293 345/1.3 |
| 8,358,387 B2* | 1/2013 | Choi | G02B 6/009 349/150 |
| 2002/0118321 A1* | 8/2002 | Ge | G02F 1/133305 349/73 |
| 2002/0180902 A1 | 12/2002 | Izumi et al. | |
| 2005/0185114 A1* | 8/2005 | Cok | G02B 6/06 349/73 |
| 2006/0007054 A1* | 1/2006 | Chang | G02F 1/133524 345/1.3 |
| 2006/0007369 A1* | 1/2006 | Jin | G02F 1/13336 349/58 |
| 2006/0012733 A1* | 1/2006 | Jin | G02F 1/13336 349/73 |
| 2006/0044215 A1* | 3/2006 | Brody | G06F 3/1446 345/1.3 |
| 2006/0285362 A1* | 12/2006 | Cho | G02B 6/0068 362/633 |
| 2008/0024694 A1* | 1/2008 | Kondo | G02B 6/0085 349/58 |
| 2008/0117161 A1 | 5/2008 | Hu | |
| 2009/0147173 A1* | 6/2009 | An | G02F 1/133603 349/58 |
| 2010/0128195 A1* | 5/2010 | Li | G02F 1/133603 349/58 |
| 2010/0188607 A1* | 7/2010 | Park | G02B 6/0073 349/62 |
| 2013/0222722 A1* | 8/2013 | Zhao | G09G 5/36 349/33 |
| 2015/0177784 A1* | 6/2015 | Varadarajan | G06F 1/1626 361/679.3 |

FOREIGN PATENT DOCUMENTS

| | | |
|---|---|---|
| KR | 2002-0093809 A | 12/2002 |
| KR | 10-2008-0044757 A | 5/2008 |

* cited by examiner

TILED DISPLAY AND BEZELLESS LIQUID CRYSTAL DISPLAY APPARATUS

CROSS-REFERENCE TO THE RELATED APPLICATIONS

This application claims priority from U.S. Provisional Application No. 61/970,489, filed Mar. 26, 2014, in the United States Patent and Trademark Office, and also claims priority from Korean Patent Application No. 10-2014-0101785, filed Aug. 7, 2014, in the Korean Intellectual Property Office, the disclosures of which are incorporated herein by reference in their entirety.

BACKGROUND

1. Field

Apparatuses and methods consistent with exemplary embodiments relate to a tiled display, more particularly, to a tiled display and a bezelless liquid crystal display (LCD) apparatus formed by using a plurality of bezelless LCD panels from at least one side of which liquid crystal pixels are exposed.

2. Description of the Related Art

Generally, a tiled display is formed by connecting two or more LCDs. However, since there is a bezel that forms a border of an LCD, when two LCDs are connected to display images, a portion where the bezels of the two displays exist becomes a discrete area where an image is discontinued.

Accordingly, a structure in which an optical member or a sub-display is installed in the connecting portion where the bezel is disclosed has been developed to eliminate or minimize such discrete area. A tiled display in the connecting portion of which the optical member or the sub-display is installed can reduce the discrete area. However, the tiled display needs additional components and a separate image processing corresponding to the optical member or the sub-display. Also, the tiled display has a narrow viewing angle and a difficulty of installation.

Accordingly, development of a tiled display that has no discrete area and easy installation is required.

SUMMARY

Exemplary embodiments are provided in order to overcome the above drawbacks and other problems associated with the related art arrangement. The exemplary embodiments provide a tiled display and a bezelless LCD apparatus which are formed by using bezelless LCD panels from at least one side of which pixels such as liquid crystal pixels are exposed so that a discrete area does not occur and installation is easy.

According to an exemplary embodiment, there is provided a tiled display which may include: a plurality of bezelless liquid crystal display (LCD) panels in which pixels are exposed from at least one of a top side, a bottom side, a left side, and a right side thereof; at least one backlight unit disposed below the plurality of bezelless LCD panels and configured to emit light. The plurality of bezelless LCD panels may be disposed such that sides from which the pixels are exposed are connected to each other, the backlight unit may include a plurality of light emitting diodes (LEDs) configured to emit the light to the bezelless LCD panel, and the plurality of LEDs may be disposed at equal intervals below the plurality of bezelless LCD panels including a portion where the plurality of bezelless LCD panels are connected to each other.

The plurality of bezelless LCD panels may include at least one single side bezelless LCD panel from a left side or a right side of which pixels are exposed.

The single side bezelless LCD panel may include a gate drive integrated circuit disposed on the right side or the left side of the single side bezelless LCD panel.

The single side bezelless LCD panel may include a color filter with no black matrix on a left side or a right side thereof.

The plurality of bezelless LCD panels may include at least one two-side bezelless LCD panel from a left side and a right side of which the liquid crystal pixels are exposed.

The two-side bezelless LCD panel may include a gate drive integrated circuit and a source drive integrated circuit disposed on a top side and a bottom side of the two-side bezelless LCD panel.

The two-side bezelless LCD panel may include a color filter with no black matrix on a left side and a right side thereof.

The plurality of bezelless LCD panels may include at least one three-side bezelless LCD panel from three sides of which the liquid crystal pixels are exposed.

The three-side bezelless LCD panel may include a gate drive integrated circuit and a source drive integrated circuit disposed on a same side of the three-side bezelless LCD panel.

The three-side bezelless LCD panel may be configured to activate one line of pixels or two lines of pixels by a single gate signal.

Two adjacent bezelless LCD panels among the plurality of bezelless LCD panels may be disposed such that respective sides of the two adjacent bezelless LCD panels from which pixels are exposed are in contact with each other.

Two adjacent bezelless LCD panels among the plurality of bezelless LCD panels may be disposed such that outmost pixel lines disposed in respective sides of the two adjacent bezelless LCD panels from which pixels are exposed overlap with each other.

An upper one of the two adjacent bezelless LCD panels may include a lower polarization member whose portion corresponding to the overlapped liquid crystal pixel line is removed, and a lower one of the two adjacent bezelless LCD panels may include an upper polarization member whose portion corresponding to the overlapped liquid crystal pixel line is removed.

Each of the plurality of bezelless LCD panels may include a transparent dummy panel formed on a side from which pixels are exposed, and two adjacent bezelless LCD panels among the plurality of bezelless LCD panels may be disposed such that the transparent dummy panel of one of the two adjacent bezelless LCD panels overlaps with an exposed pixel line of the other of the two adjacent bezelless LCD panels.

Each of the plurality of bezelless LCD panels may include a transparent sealing part sealing a side from which pixels are exposed, and two adjacent bezelless LCD panels among the plurality of bezelless LCD panels are disposed such that the transparent sealing part of one of the two adjacent bezelless LCD panels overlaps with an exposed pixel line of the other of the two adjacent bezelless LCD panels.

Each of the plurality of bezelless LCD panels may include at least one position detecting sensor to detect a position relationship of an adjacent bezelless LCD panel.

The single side bezelless LCD panel may be formed by removing one of two gate portions provided on two sides of an LCD panel.

According to another exemplary embodiment, there is provided a bezelless LCD apparatus which may include: a bezelless LCD panel configured such that pixels are exposed from at least one of a left side and a right side thereof; and at least one position detecting sensor configured to detect a position of a bezelless LCD panel to be disposed at a left or a right of the housing.

The bezelless LCD apparatus may further include a backlight unit disposed below the bezelless LCD panel and configured to emit light; a housing supporting the bezelless LCD panel and the backlight unit; and a stand supporting the housing.

The bezelless LCD apparatus may further include a moving unit disposed in the stand and configured to move the housing in vertical and horizontal directions. The moving unit may be further configured to move the housing depending on a signal of the position detecting sensor Other objects, advantages and salient features will become apparent from the following detailed description, which, taken in conjunction with the annexed drawings, discloses exemplary embodiments.

BRIEF DESCRIPTION OF THE DRAWINGS

These and/or other aspects and advantages of the inventive concept will become apparent and more readily appreciated from the following description of the exemplary embodiments, taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1A:
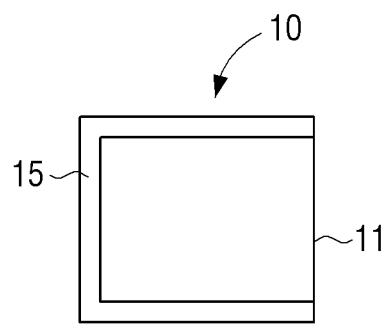
FIGS. 1A to 1D are views illustrating a single side bezelless LCD panel being used in a tiled display according to an exemplary embodiment.
Figure 1B:
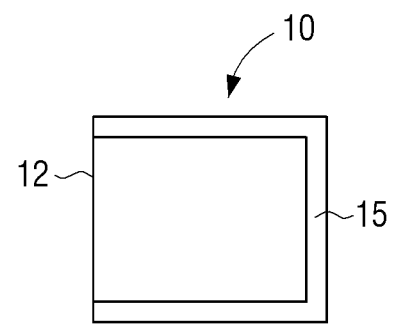
Figure 1C:
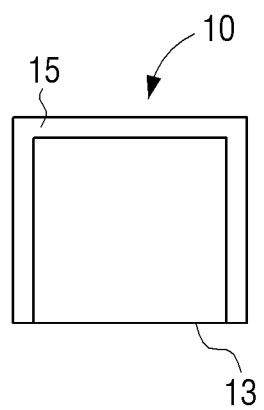
Figure 1D:
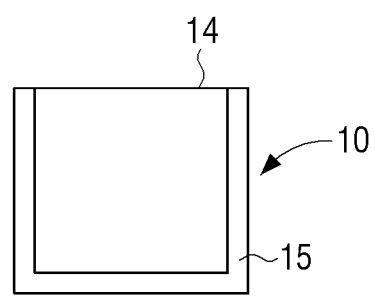

Hereinafter, certain exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

FIGS. 1A to 1D are views illustrating a single side bezelless LCD panel being used in a tiled display according to an exemplary embodiment. FIGS. 2A to 2E are views illustrating a two-side bezelless LCD panel being used in a tiled display according to an exemplary embodiment. FIG. 3 is a view illustrating a three-side bezelless LCD panel being used in a tiled display according to an exemplary embodiment.

Referring to FIGS. 1A to 1D, 2A to 2E, and 3, a bezelless LCD panel 10, 20, and 30 according to the exemplary embodiments is formed such that liquid crystal pixels are exposed from at least one of four sides of a LCD panel.

In detail, FIG. 1 illustrates a single side bezelless LCD panel 10 from one of four sides of which liquid crystal pixels are exposed, and whose remaining three sides are surrounded by a bezel 15. The single side bezelless LCD panel 10 may be formed such that, as illustrated in FIG. 1A, a right side bezel thereof is removed and a right end liquid crystal pixel line 11 is exposed, or, as illustrated in FIG. 1B, a left side bezel thereof is removed and a left end liquid crystal pixel line 12 is exposed. Also, the single side bezelless LCD panel 10 may be formed such that, as illustrated in FIG. 1C, a bottom side bezel thereof is removed and a bottom end liquid crystal pixel line 13 is exposed, or, as illustrated in FIG. 1D, a top side bezel thereof is removed and a top end liquid crystal pixel line 14 is exposed.

FIG. 2 illustrates a two-side bezelless LCD panel 20 from two sides of four sides of which liquid crystal pixels are exposed, and whose remaining two sides are surrounded by a bezel 25. In detail, the two-side bezelless LCD panel 20 may be formed such that, as illustrated in FIG. 2A, right and bottom side bezels thereof are removed and right and bottom end liquid crystal pixel lines 21 and 22 are exposed, or, as illustrated in FIG. 2B, left and bottom side bezels thereof are removed and left and bottom end liquid crystal pixel lines 23 and 22 are exposed. Also, the two-side bezelless LCD panel 20 may be formed such that, as illustrated in FIG. 2C, left and top side bezels thereof are removed and left and top end liquid crystal pixel lines 23 and 24 are exposed, or, as illustrated in FIG. 2D, right and top side bezels thereof are removed and right and top end liquid crystal pixel lines 21 and 24 are exposed. Further, as illustrated in FIG. 2E, the two-side bezelless LCD panel 20 may be formed such that left and right side bezels thereof are removed and left and right end liquid crystal pixel lines 23 and 21 are exposed.

FIG. 3 illustrates a three-side bezelless LCD panel 30 from three of four sides of which liquid crystal pixels are exposed, and whose remaining one side is surrounded by a bezel 35. In detail, the three-side bezelless LCD panel 30 is formed such that, as illustrated in FIG. 3, left, right, and bottom side bezels are removed, and so left, right, and bottom end liquid crystal pixel lines 31, 32, and 33 are exposed. However, the three-side bezelless LCD panel 30 is not limited thereto. Although not illustrated, the three-side bezelless LCD panel 30 may be formed by maintaining one of left, right, and bottom side bezels and removing the remaining three sides.

The single side, two-side, and three-side bezelless LCD panels 10, 20, and 30 as described above and a backlight unit which is disposed below each of the single side, two-side, and three-side bezelless LCD panels 10, 20, and 30 may form a single side, two-side, and three-side bezelless LCD apparatus. Accordingly, when the backlight unit emits light, the single side, two-side, and three-side bezelless LCD panels 10, 20, and 30 can display images.

Figure 4:
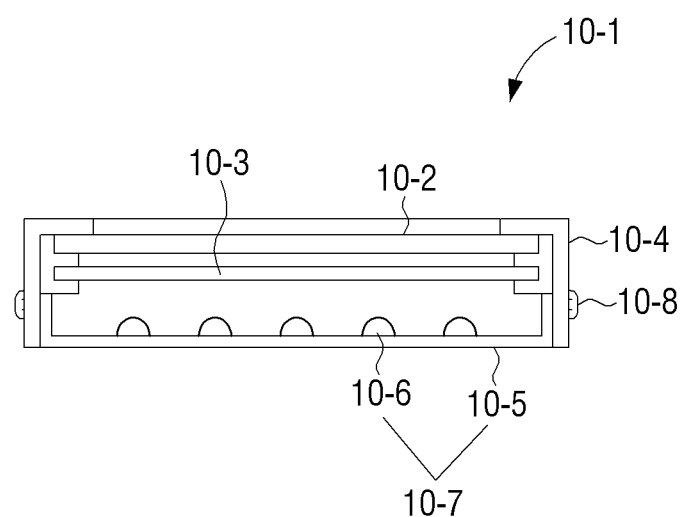
FIG. 4 is a side view schematically illustrating a side of a single side bezelless LCD apparatus, according to an exemplary embodiment.
Figure 5:
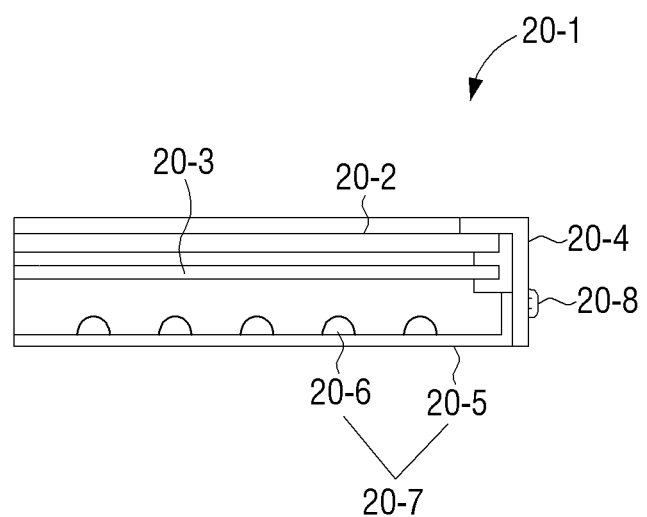
FIG. 5 is a side view schematically illustrating a side of a two-side bezelless LCD apparatus, according to an exemplary embodiment.
Figure 6:
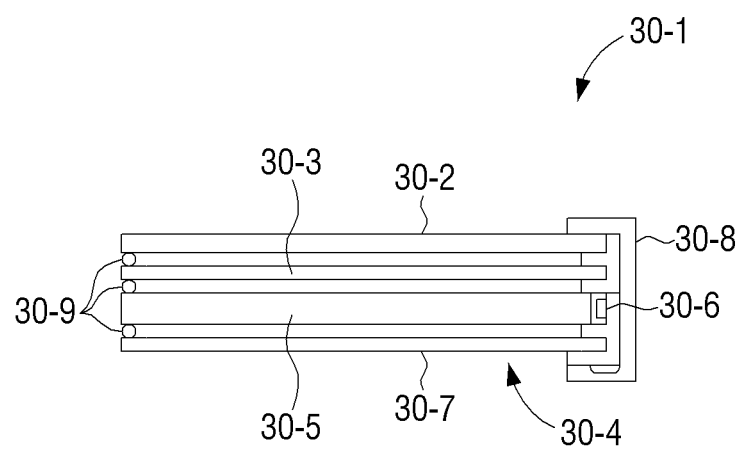
FIG. 6 is a side view schematically illustrating a side of a three-side bezelless LCD apparatus, according to an exemplary embodiment.

FIGS. 4 to 6 are cross-sectional views schematically illustrating single side, two-side, and three-side bezelless LCD apparatuses according to exemplary embodiments.

FIG. 4 is a side view schematically illustrating a side of a single side bezelless LCD apparatus, FIG. 5 is a side view schematically illustrating a side of a two-side bezelless LCD apparatus, and FIG. 6 is a side view schematically illustrating a side of a three-side bezelless LCD apparatus.

Referring to FIG. 4, a single side bezelless LCD apparatus 10-1 includes a single side bezelless LCD panel 10-2, a diffuser plate 10-3, and a backlight unit 10-7. The single side bezelless LCD panel 10-2 and the diffuser plate 10-3 are supported by an upper housing 10-4 which forms the bezel 15 surrounding three sides of the bezelless LCD panel 10 as illustrated in FIG. 1. Accordingly, the upper housing 10-4 is formed in a shape in which one side of a rectangular frame is removed. The diffuser plate 10-3 provides light emitting from a plurality of light emitting diodes (LEDs) 10-6 of the backlight unit 10-7 to the single side bezelless LCD panel 10-2, and may include optical sheets, such as a prism sheet, etc. The backlight unit 10-7 includes a lower housing 10-5 and the plurality of LEDs 10-6 which are disposed on a top surface of the lower housing 10-5 and emit light toward the single side bezelless LCD panel 10-2. The lower housing 10-5 is coupled to the upper housing 10-4 by fastening members 10-8, such as bolts, screws, etc. The lower housing 10-5 is also formed in a shape in which one side of the lower housing 10-5 is removed like the upper housing 10-4. Accordingly, as illustrated in FIG. 4, one side of each of the single side bezelless LCD panel 10-2 and the diffuser plate 10-3 is exposed from one side of the single bezelless LCD apparatus 10-1. Also, FIG. 4 illustrates the lower housing 10-5 on which five LEDs 10-6 are disposed. However, the number of the LEDs 10-6 is not limited thereto. The number of LEDs 10-6 may be appropriately determined depending on a size of the single side bezelless LCD panel 10-2.

Referring to FIG. 5, a two-side bezelless LCD apparatus 20-1 includes a two-side bezelless LCD panel 20-2, a diffuser plate 20-3, and a backlight unit 20-7. The two-side bezelless LCD panel 20-2 and the diffuser plate 20-3 are supported by an upper housing 20-4 which forms the bezel 25 surrounding two sides of the bezelless LCD panel 20 as illustrated in FIG. 2. Accordingly, the upper housing 20-4 is formed in a shape in which two sides of a rectangular frame are removed. The diffuser plate 20-3 provides light emitting from a plurality of LEDs 20-6 of the backlight unit 20-7 to the two-side bezelless LCD panel 20-2, and may include optical sheets, such as a prism sheet, etc. The backlight unit 20-7 includes a lower housing 20-5 and the plurality of LEDs 20-6 which are disposed on a top surface of the lower housing 20-5 and emit light toward the two-side bezelless LCD panel 20-2. The lower housing 20-5 is coupled to the upper housing 20-4 by fastening members 20-8, such as bolts, screws, etc. The lower housing 20-5 is also formed in a shape in which two sides of the lower housing 20-5 are removed like the upper housing 20-4. Accordingly, two sides of each of the two-side bezelless LCD panel 20-2 and the diffuser plate 20-3 are exposed from two sides of the two-side bezelless LCD apparatus 20-1. Also, FIG. 5 illustrates the lower housing 20-5 on which five LEDs 20-6 are disposed. However, the number of the LEDs 20-6 is not limited thereto. The number of LEDs 20-6 may be appropriately determined depending on a size of the two-side bezelless LCD panel 20-2.

Referring to FIG. 6, a three-side bezelless LCD apparatus 30-1 includes a three-side bezelless LCD panel 30-2, a diffuser plate 30-3, and a backlight unit 30-4. The three-side bezelless LCD panel 30-2, the diffuser plate 30-3, and the backlight unit 30-4 are supported by a fixing frame 30-8 which forms the bezel 35 surrounding one side of the bezelless LCD panel 30 as illustrated in FIG. 3. The fixing frame 30-8 is formed to fix one side of each of the three-side bezelless LCD panel 30-2, the diffuser plate 30-3, and the backlight unit 30-4. Here, a backlight unit 30-4 having a light guide plate 30-5 may be used to support the three-side bezelless LCD panel 30-2 and the diffuser plate 30-3. In detail, the backlight unit 30-4 may include the light guide plate 30-5, a plurality of LEDs 30-6 which are disposed on the fixing frame 30-8 near one side of the light guide plate 30-5, and a lower plate 30-7. In FIG. 6, sides of the three-side bezelless LCD panel 30-2, the diffuser plate 30-3, the light guide plate 30-5, and the lower plate 30-7 opposite to the fixing frame 30-8 may be fixed to each other by optical bonding 30-9. The optical bonding 30-9 may use optical clear resin or optical clear adhesive. The diffuser plate 30-3 provides light emitting through the light guide plate 30-5 of the backlight unit 30-4 to the three-side bezelless LCD panel 30-2, and may include optical sheets, such as a prism sheet, etc. FIG. 6 illustrates the three-side bezelless LCD apparatus using the edge-type backlight unit 30-4. Alternatively, the three-side bezelless LCD apparatus may be formed to use a direct-type backlight unit as illustrated in FIGS. 4 and 5.

FIGS. 7A to 7D illustrate tiled displays formed to use the single bezelless LCD panel, the two-side bezelless LCD panel, and the three-side bezelless LCD panel as described above. When forming a tiled display, a proper support frame may be used according to a shape and size of a desired tiled display. The support frame can firmly fix the single side, the two-side, and the three-side bezelless LCD apparatuses constituting the tiled display. In FIGS. 7A to 7D, the support frame is disposed below the plurality of bezelless LCD panels, and not shown.

Figure 7A:
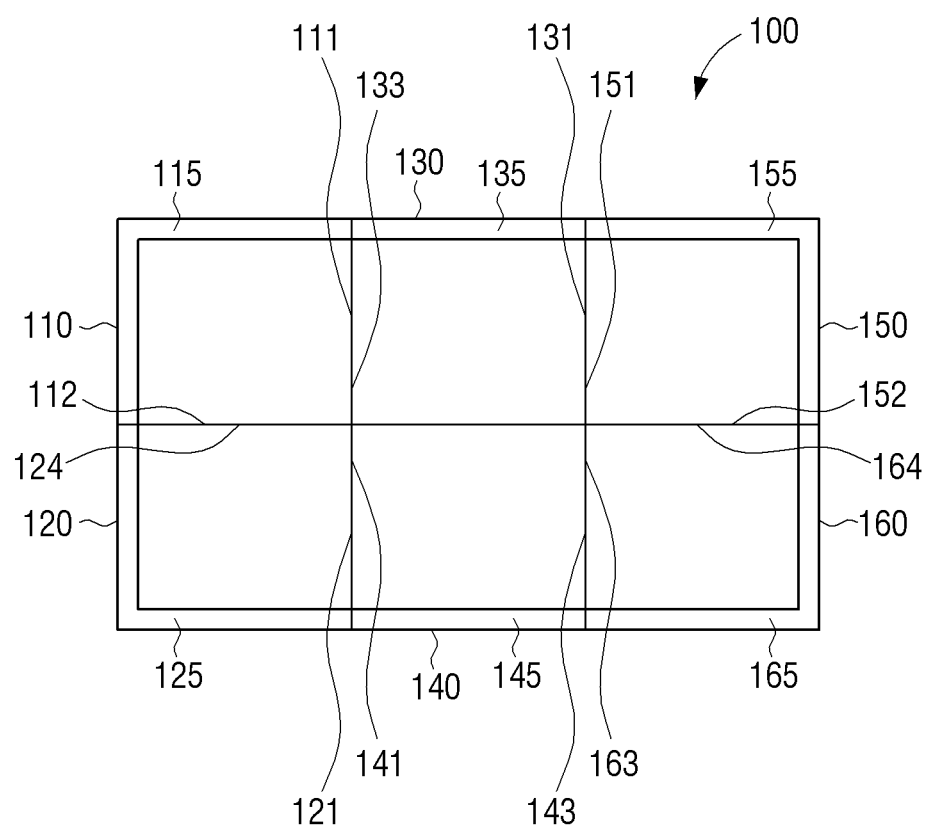
FIGS. 7A to 7D are front views illustrating tiled displays according to various exemplary embodiments.

FIG. 7A illustrates a tiled display 100 in which six bezelless LCD panels are arranged in a form of 2×3. In this case, four two-side bezelless LCD panels 110, 120, 150, and 160 and two three-side bezelless LCD panels 130 and 140 are used. A first display 110 is a two-side bezelless LCD panel in which there is a bezel 115 on a top side and a left side, and liquid crystal pixel lines are exposed from a right side 111 and a bottom side 112. A second display 120 is a two-side bezelless LCD panel in which there is a bezel 125 on a left side and a bottom side, and liquid crystal pixel lines are exposed from a right side 121 and a top side 124. A third display 130 is a three-side bezelless LCD panel in which there is a bezel 135 on a top side, and liquid crystal pixels lines are exposed from a left side 133, a right side 131 and a bottom side. A fourth display 140 is a three-side bezelless LCD panel in which there is a bezel 145 on a bottom side, and liquid crystal pixels lines are exposed from a left side 141, a right side 143 and a top side. A fifth display 150 is a two-side bezelless LCD panel in which there is a bezel 155 on a top side and a right side, and liquid crystal pixels lines are exposed from a left side 151 and a bottom side 152. A sixth display 160 is a two-side bezelless LCD panel in which there is a bezel 165 on a right side and a bottom side, and liquid crystal pixels lines are exposed from a left side 163 and a top side 164. Since the tiled display 100 as illustrated in FIG. 7A has a structure in which exposed liquid crystal pixels lines of the six bezelless LCD panels 110, 120, 130, 140, 150, and 160 are connected to each other, a user can view images in which discontinuity in the connecting portions does not exist or is minimized through a large screen.

Figure 7B:
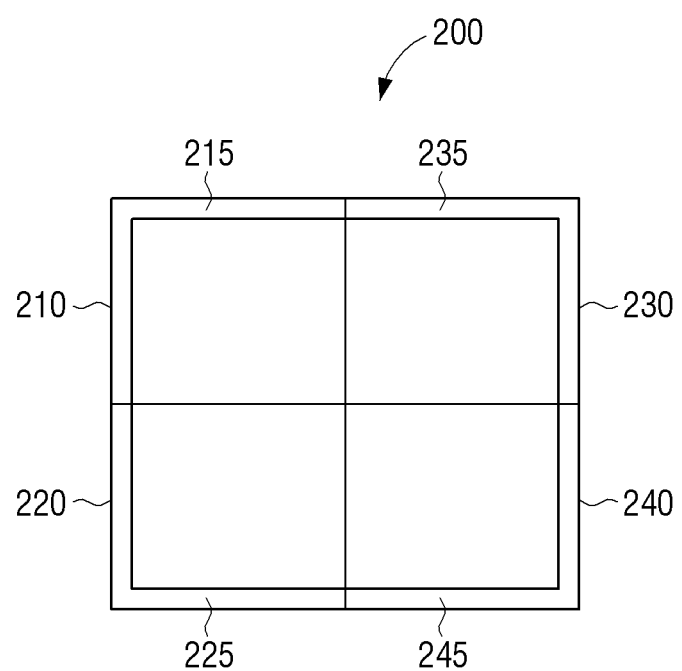

FIG. 7B illustrates a tiled display 200 in which four bezelless LCD panels 210, 220, 230, and 240 are arranged in a form of 2×2. In this case, four two-side bezelless LCD panels 210, 220, 230, and 240 are used. A first display 210 is a two-side bezelless LCD panel in which liquid crystal pixel lines are exposed from a right side and a bottom side. A second display 220 is a two-side bezelless LCD panel in which liquid crystal pixel lines are exposed from a right side and a top side. A third display 230 is a two-side bezelless LCD panel in which liquid crystal pixel lines are exposed from a left side and a bottom side. A fourth display 240 is a two-side bezelless LCD panel in which liquid crystal pixel lines are exposed from a left side and a top side. Reference numerals 215, 225, 235, and 245 in FIG. 7B illustrate bezels of the first, second, third, and fourth displays 210, 220, 230, and 240, respectively.

Figure 7C:
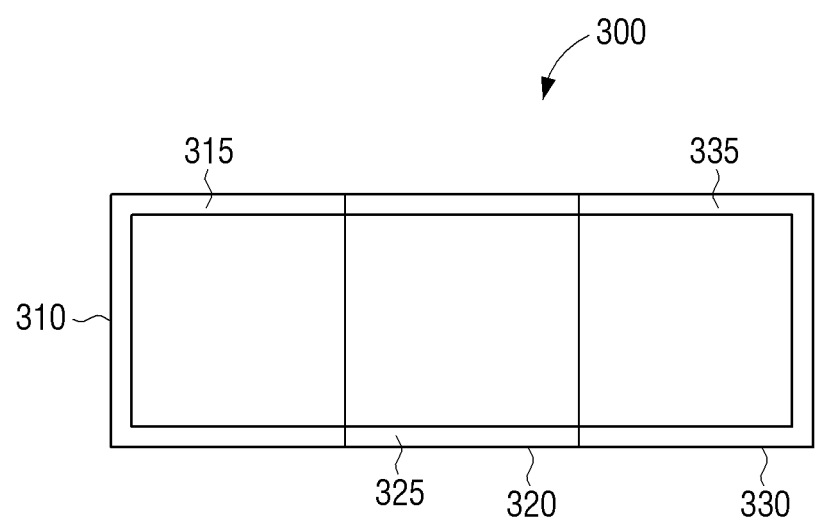

FIG. 7C illustrates a tiled display 300 in which three bezelless LCD panels 310, 320, and 330 are arranged in a form of 1×3. In this case, two single side bezelless LCD panels 310 and 330, and one two-side bezelless LCD panel 320 are used. A first display 310 is a single side bezelless LCD panel in which a liquid crystal pixel line is exposed from a right side. A second display 320 is a two-side bezelless LCD panel in which liquid crystal pixel lines are exposed from a right side and a left side. A third display 330 is a single side bezelless LCD panel in which a liquid crystal pixel line is exposed from a left side. Reference numerals 315, 325, and 335 in FIG. 7C illustrate bezels of the first, second, and third displays 310, 320, and 330, respectively.

Figure 7D:
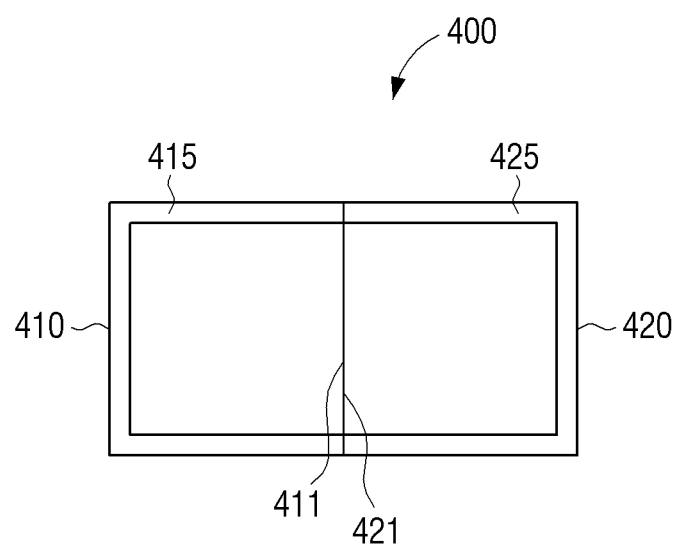

FIG. 7D illustrates a tiled display 400 in which two bezelless LCD panels 410 and 420 are arranged in a form of 1×2. In this case, two single side bezelless LCD panels 410 and 420 are used. A first display 410 is a single side bezelless LCD panel in which a liquid crystal pixel line is exposed from a right side 411. A second display 420 is a single side bezelless LCD panel in which a liquid crystal pixel line is exposed from a left side 421. Reference numerals 415 and 425 in FIG. 7D illustrate bezels of the first and second displays 410 and 420, respectively.

Figure 8:
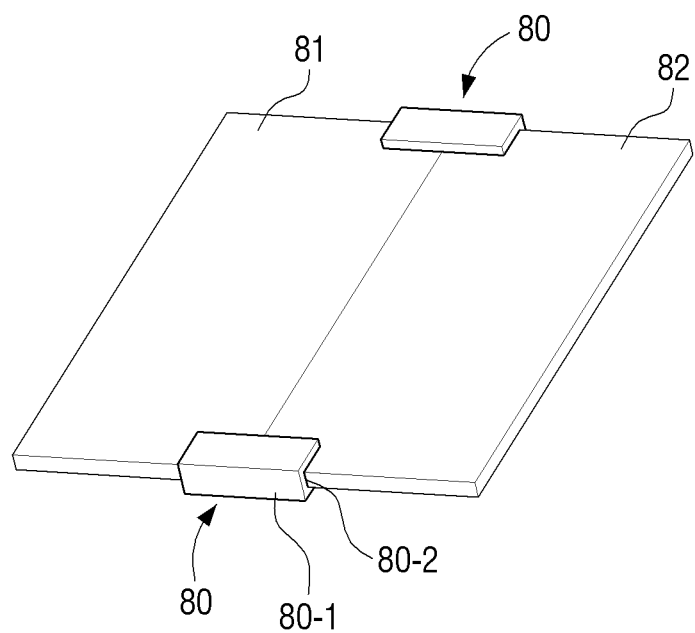
FIG. 8 is a partially perspective view illustrating two bezelless LCD panels connected by connecting members, according to an exemplary embodiment.

In the tiled displays 100, 200, 300, and 400 as illustrated in FIGS. 7A to 7D, a portion in which two bezelless LCD panels 81 and 82 are in contact with each other may be supported by two connecting members 80 as illustrated in FIG. 8. The connecting member 80 may be formed in a rectangular block 80-1 having a groove 80-2 in which one side of each of the LCD panels 81 and 82 can be inserted. Here, the connecting member 80 is disposed to prevent interference with the upper housing configuring the bezelless LCD apparatus. When the connecting members 80 are used as illustrated in FIG. 8, two LCD panels 81 and 82 may be stably connected to each other.

Figure 9:
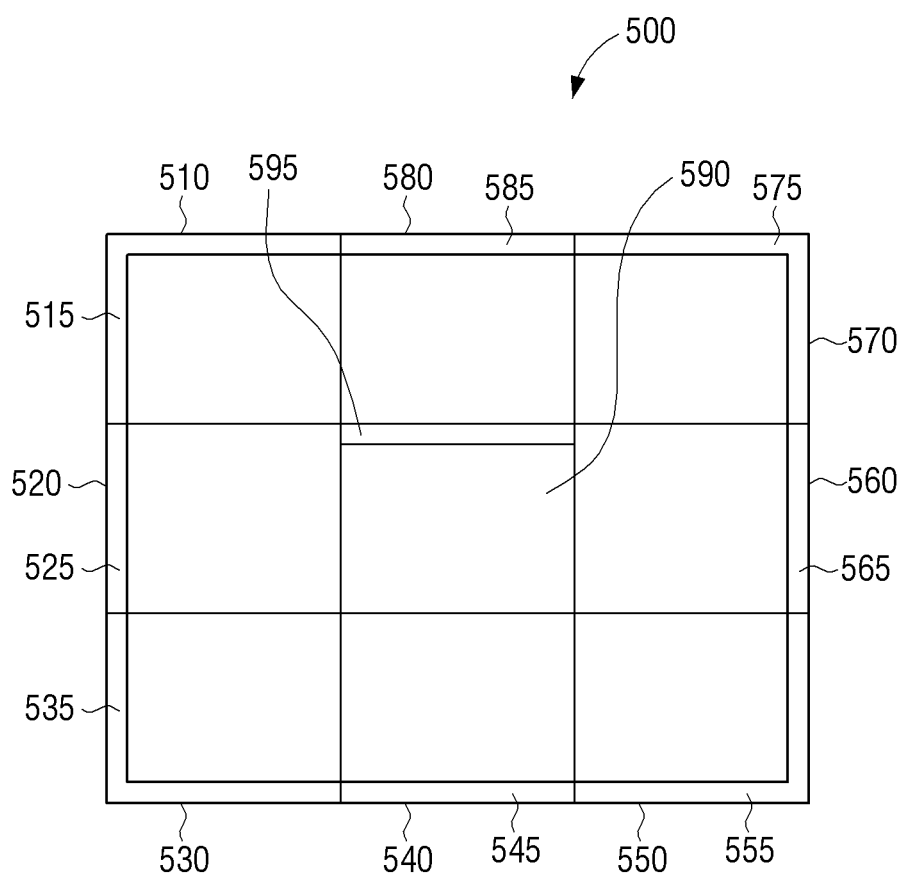
FIG. 9 is a front view illustrating a tiled display according to another exemplary embodiment.

FIG. 9 illustrates a tiled display 500 in which nine bezelless LCD apparatuses are arranged in a form of 3×3. In this case, four two-side bezelless LCD panels 510, 530, 550, and 570 and five three-side bezelless LCD panels 520, 540, 560, 580, and 590 are used. Each of the first, third, fifth, and seventh displays 510, 530, 550, and 570 is a two-side bezelless LCD panel in which there is a bezel 515, 535, 555, and 575 on two sides, and liquid crystal pixel lines are exposed from remaining two sides. Each of the second, fourth, sixth, and eighth displays 520, 540, 560, and 580 is a three-side bezelless LCD panel in which there is a bezel 525, 545, 565, and 585 on only one side, and liquid crystal pixel lines are exposed from remaining three sides. A ninth display 590 which is located in the center is also a three-side bezelless LCD panel in which there is a bezel 595 on only one side, and liquid crystal pixels lines are exposed from remaining three sides. Accordingly, in order to minimize discontinuity of an image near the bezel 595 of the ninth display 590, an optical member, such as a lens, or a sub-display may be disposed in the bezel 595. Since the tiled display 500 as illustrated in FIG. 9 has a structure in which exposed liquid crystal pixel lines of the nine bezelless LCD panels 510, 520, 530, 540, 550, 560, 570, 580, and 590 are connected to one another, a user can view images in which discontinuity in the connecting portions is minimized through a large screen.

Hereinafter, a method for manufacturing a bezelless LCD panel as described above will be described with reference to FIGS. 10 and 11.

A bezelless LCD panel may be manufactured by using a LCD panel having gate portions on two sides thereof or a LCD panel having a gate portion only on one side thereof.

Figure 10:
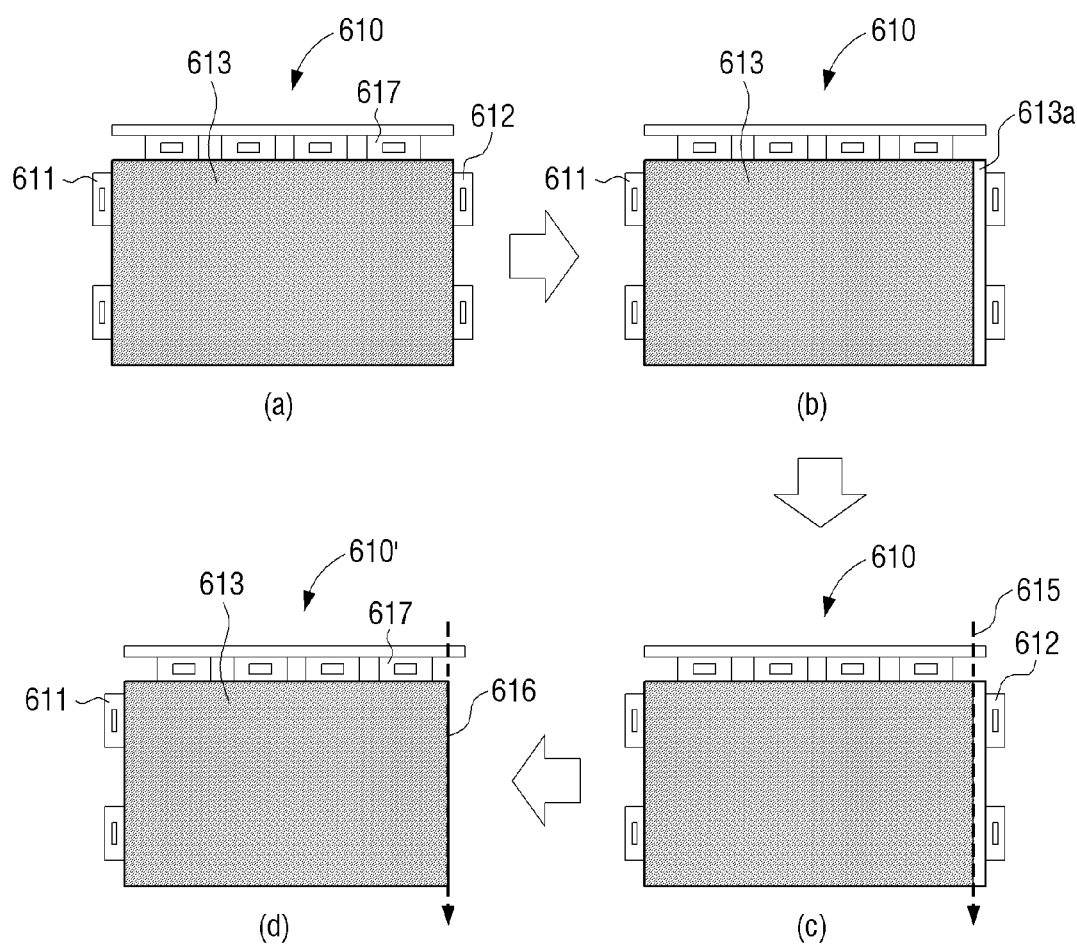
FIG. 10 is a view for explaining a method of manufacturing a single side bezelless LCD panel using a LCD panel on two sides of which gate portions are, according to an exemplary embodiment.
Figure 11:
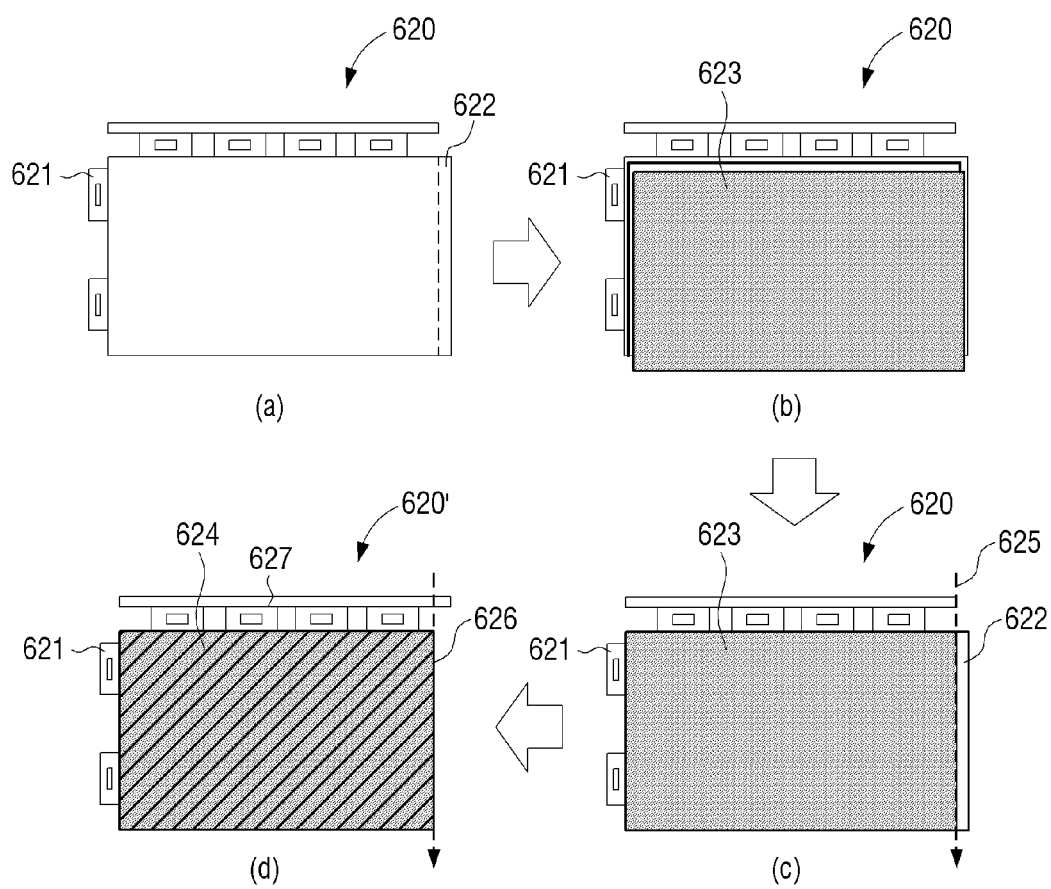
FIG. 11 is a view for explaining a method of manufacturing a single side bezelless LCD panel using a LCD panel on only one side of which a gate portion is disposed, according to an exemplary embodiment.

FIG. 10 is a view for explaining a method for manufacturing a single side bezelless LCD panel using a LCD panel on two sides of which gate portions are disposed, and FIG. 11 is a view for explaining a method for manufacturing a single side bezelless LCD panel using a LCD panel on only one side of which a gate portion is disposed.

A process for manufacturing a single side bezelless LCD panel using a LCD panel 610 on two sides of which gate portions 611 and 612 are disposed will be described with reference to FIG. 10.

First, the LCD panel 610 having gate portions 611 and 612 on two sides thereof is provided as illustrated in FIG. 10(*a*). Then, as illustrated in FIG. 10(*b*), a portion of an upper polarization member 613 is peeled off from one side of the LCD panel 610 from which liquid crystal pixels are exposed. At this time, the upper polarization member 613 is peeled off from the LCD panel 610 by a width corresponding to a width of a black matrix. In FIG. 10(*b*), a reference numeral 613*a* indicates a part of the LCD panel 610 from which the upper polarization member 613 is peeled off. Next, as illustrated in FIG. 10(*c*), the part of the LCD panel 610 from which the upper polarization member 613 was peeled off is cut along an arrow 615 so as to expose an outermost liquid crystal pixel line of one side of the LCD panel 610. After that, as illustrated in FIG. 10(*d*), a side surface 616 of the exposed liquid crystal pixel line is sealed so that manufacturing of the single bezelless LCD panel 610' is completed. Accordingly, the single bezelless LCD panel 610' manufactured as illustrated in FIG. 10(*d*) may be driven by a source drive integrated circuit disposed in a source portion 617 of the upper portion thereof and a gate drive integrated circuit disposed in a gate portion 611 of a left portion thereof.

A process for manufacturing the single bezelless LCD panel using a LCD panel having a gate portion in one side thereof will be described with reference to FIG. 11.

First, as illustrated in FIG. 11(*a*), a LCD panel 620 having a gate portion 621 in one side thereof is provided. At this time, the LCD panel 620 is a state in which a color filter 623 and an upper polarization member 624 are not disposed on the LCD panel 620. In other words, the LCD panel 620 is a lower LCD panel which includes a lower polarization member and a liquid crystal layer. Also, since there is a side portion 622 which becomes a black matrix of a certain width on which a gate line may be formed in a side of the lower LCD panel 620 where there is no gate portion, the outmost liquid crystal pixel line is not exposed to the outside. Then, as illustrated in FIG. 11(*b*), a color filter 623 whose portion corresponding to the black matrix was removed is attached on the top surface of the liquid crystal layer. At this time, sealant is previously applied to the liquid crystal layer so that the color filter 623 can be attached to the top surface of the liquid crystal layer. Thus, as illustrated in FIG. 11(*c*), the side portion 622 of the lower LCD panel 620 to which the color filter 20 is not attached is exposed. Next, as illustrated in FIG. 11(*c*), the lower LCD panel 620 is cut along the side of the color filter 20 from which the black matrix was removed, namely, an arrow 625 so as to expose an outermost liquid crystal pixel line 626 of one side of the LCD panel 620. After that, as illustrated in FIG. 11(*d*), the upper polarization member 624 is attached to the top surface of the color filter 623. Then, the exposed liquid crystal pixel line 626 is sealed so that manufacturing of the single bezelless LCD panel 620' is completed. Accordingly, the single bezelless LCD panel 620' manufactured as described above may be driven by a source drive integrated circuit disposed in a source portion 627 of the upper portion thereof and a gate drive integrated circuit disposed in a gate portion 621 of a left portion thereof.

The single side bezelless LCD panel from one side of which liquid crystal pixels are exposed and the two-side bezelless LCD panel from one side and a bottom side or a top side of which liquid crystal pixels are exposed use a color filter from one side of which a black matrix portion was cut. However, the two-side bezelless LCD panels from the left and right sides of which liquid crystal pixels are exposed uses a color filter from the left and right sides of which black matrix portions are cut.

Hereinafter, a driving structure of liquid crystal pixels of a bezelless LCD panel will be explained in detail with reference to FIGS. 12, 13, and 14.

Figure 12:
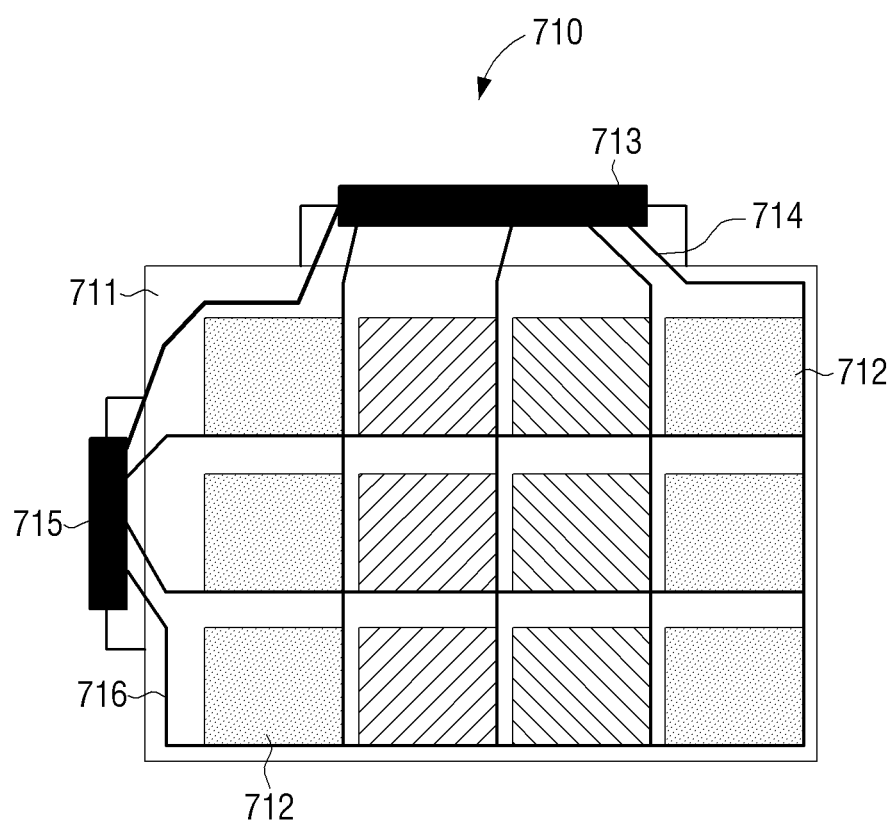
FIG. 12 is a view illustrating arrangement of source and gate driver integrated circuits of a single side bezelless LCD panel, according to an exemplary embodiment.

FIG. 12 is a view illustrating arrangement of source and gate driver integrated circuits of a single side bezelless LCD panel. Here, an upper polarization member, a color filter, and a bezel are removed from the LCD panel 710 so that a liquid crystal layer 711 is exposed. FIG. 12 illustrates only some of the liquid crystal pixels 712 for the convenience of drawing. Referring to FIG. 12, a source drive integrated circuit 713 is disposed in a top portion of the liquid crystal layer 711, and a gate drive integrated circuit 715 is disposed in a left portion of the liquid crystal layer 711. The source drive integrated circuit 713 and the gate drive integrated circuit 715 are electrically connected to the liquid crystal pixels 712 through source lines 714 and gate lines 716. FIG. 12 illustrates a case in which the source drive integrated circuit 713 is disposed in the top portion of the liquid crystal layer 711, and the gate drive integrated circuit 715 is disposed in the left portion of the liquid crystal layer 711. However, the source drive integrated circuit 713 may be disposed in a bottom portion of the liquid crystal layer 711, and the gate drive integrated circuit 715 may be disposed in a right portion of the liquid crystal layer 711.

In the two-side bezelless LCD panel, source and gate drive integrated circuits may be arranged in the same manner as the single side bezelless LCD panel 710 as described above. However, in the two-side bezelless LCD panel from the left and right sides of which liquid crystal pixel lines are exposed, the source and gate drive integrated circuit 713 and 715 can not be arranged in the structure as illustrated in FIG. 12.

Figure 2A:
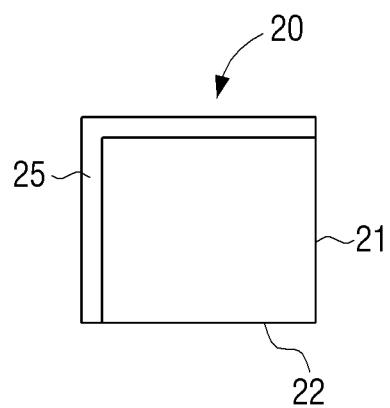
FIGS. 2A to 2E are views illustrating a two-side bezelless LCD panel being used in a tiled display according to an exemplary embodiment.
Figure 2B:
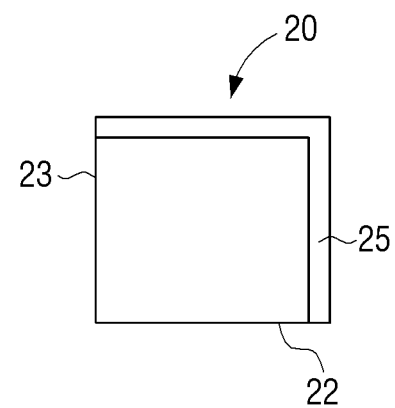
Figure 2C:
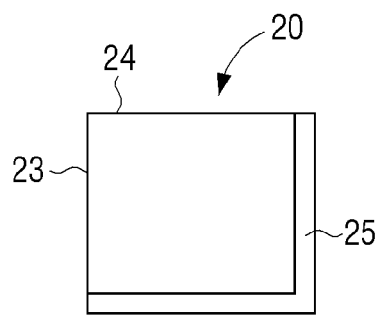
Figure 2D:
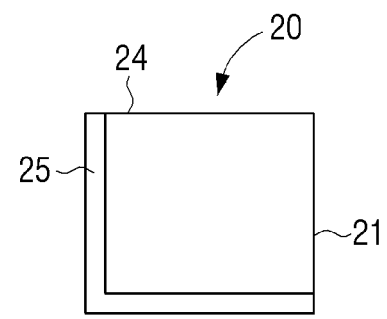
Figure 2E:
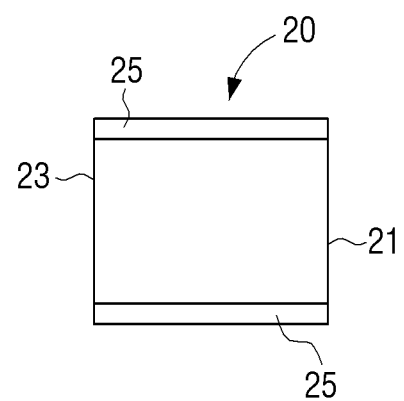
Figure 3:
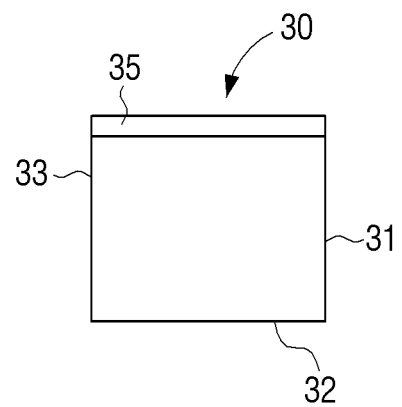
FIG. 3 is a view illustrating a three-side bezelless LCD panel being used in a tiled display according to an exemplary embodiment.
Figure 13:
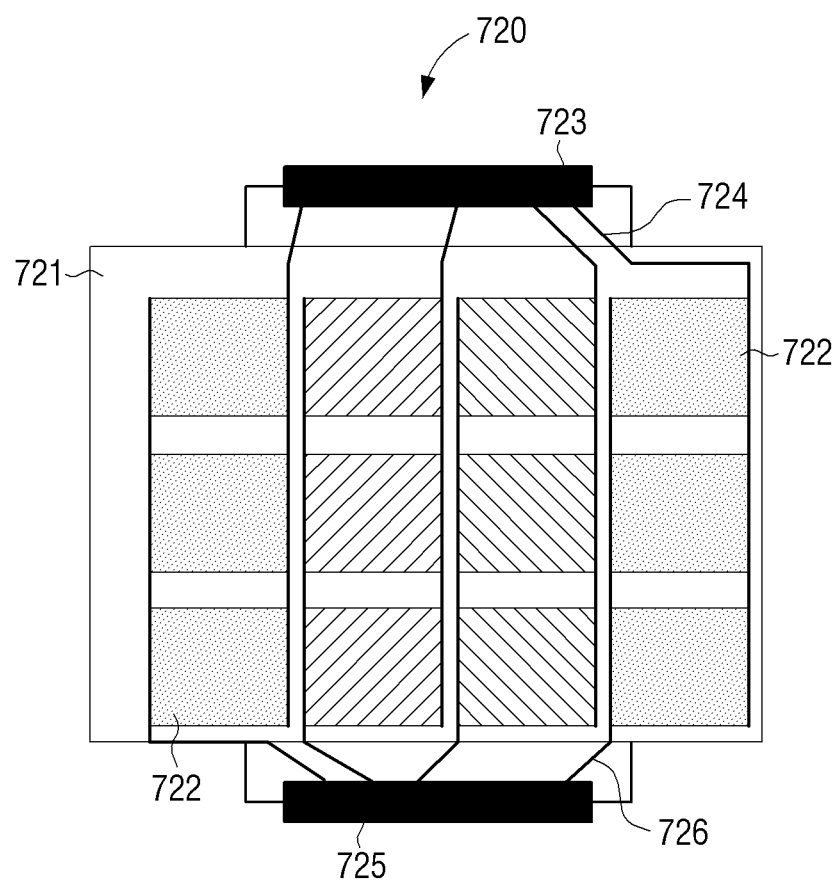
FIG. 13 is a view illustrating arrangement of source and gate driver integrated circuits of a two-side bezelless LCD panel, according to an exemplary embodiment.
Figure 14:
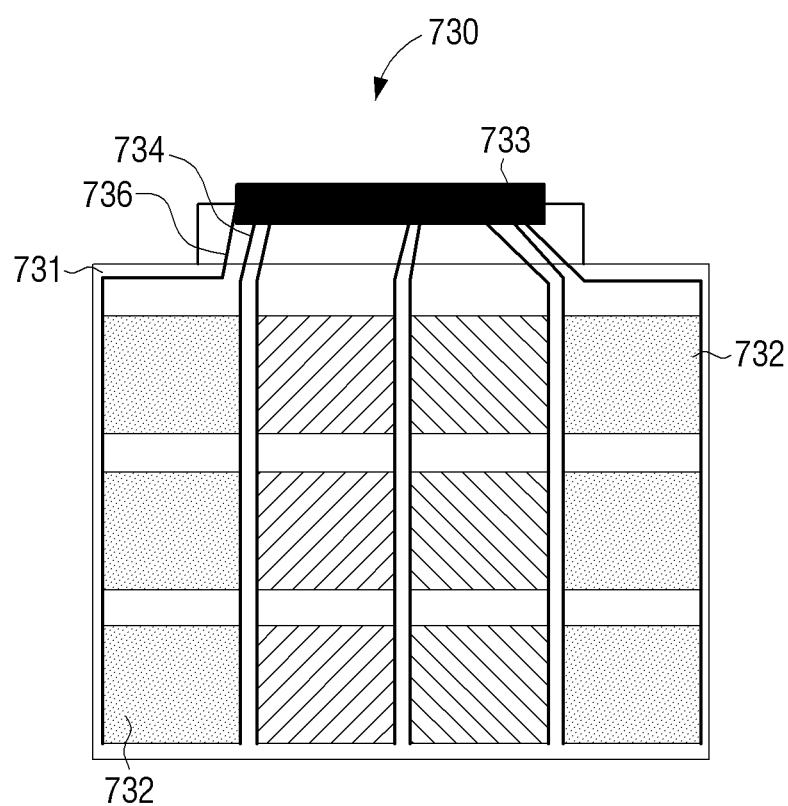
FIG. 14 is a view illustrating arrangement of source and gate driver integrated circuits of a three-side bezelless LCD panel, according to an exemplary embodiment.

Source and gate drive integrated circuits of the two-side bezelless LCD panels 20 from the left and right sides 21 and 23 of which the liquid crystal pixel lines are exposed as illustrated in FIG. 2E are arranged as illustrated in FIG. 13. In detail, referring to FIG. 13, in the two-side bezelless LCD panel 720, the source drive integrated circuit 723 is disposed in the top portion of the liquid crystal layer 721 and the gate drive integrated circuit 725 is disposed in the bottom portion of the liquid crystal layer 721. The plurality of liquid crystal pixels are electrically connected to the source drive integrated circuit 723 and the gate drive integrated circuit 725 through source lines 724 and gate lines 726.

In the three-side bezelless LCD panel 730, the source and gate drive integrated circuit 733 may be disposed in only one side of the liquid crystal layer. For example, as illustrated in FIG. 14, the source and gate drive integrated circuit 733 may be arranged in the top portion of the liquid crystal layer 731. In the case of the liquid crystal layer 731 having a structure in which the source drive integrated circuit and the gate drive integrated circuit are disposed in a same side, the source and gate drive integrated circuit 733 may be electrically connected to the liquid crystal pixels 732 in two ways.

Figure 15:
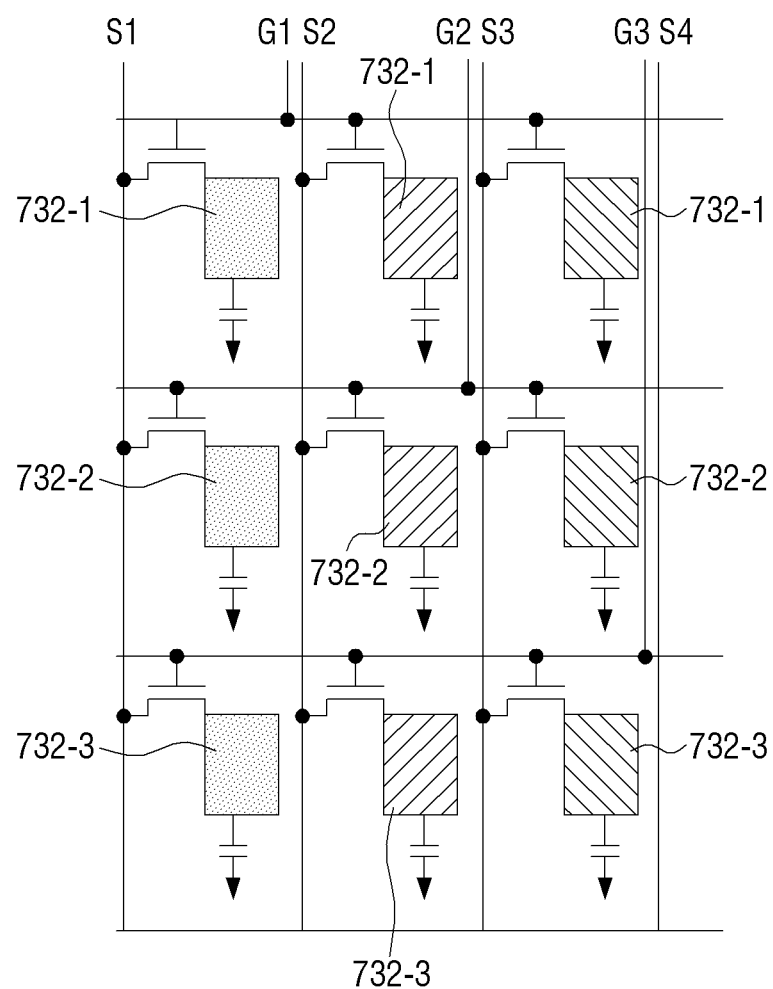
FIG. 15 is a view illustrating one example of connection of source lines and gate lines in a three-side bezelless LCD panel, according to an exemplary embodiment.

One example is that the source drive integrated circuit and the gate drive integrated circuit are connected with the plurality of liquid crystal pixels 732-1, 732-2, and 732-3 as illustrated in FIG. 15. In detail, a plurality of gate lines G1, G2, and G3 which are wired horizontally and connect the gate drive integrated circuit and the plurality of liquid crystal pixels 732-1, 732-2, and 732-3 are sequentially electrically connected to the upper part through connection lines. Here, a plurality of source lines S1, S2, S3, and S4 to electrically connect the source drive integrated circuit and the plurality of liquid crystal pixels 732-1, 732-2, and 732-3 are vertically wired. In this case, if one of the gate lines (for example, G1) is turned on, one line of the liquid crystal pixels 732-1 connected to the gate line (G1) are activated.

Figure 16:
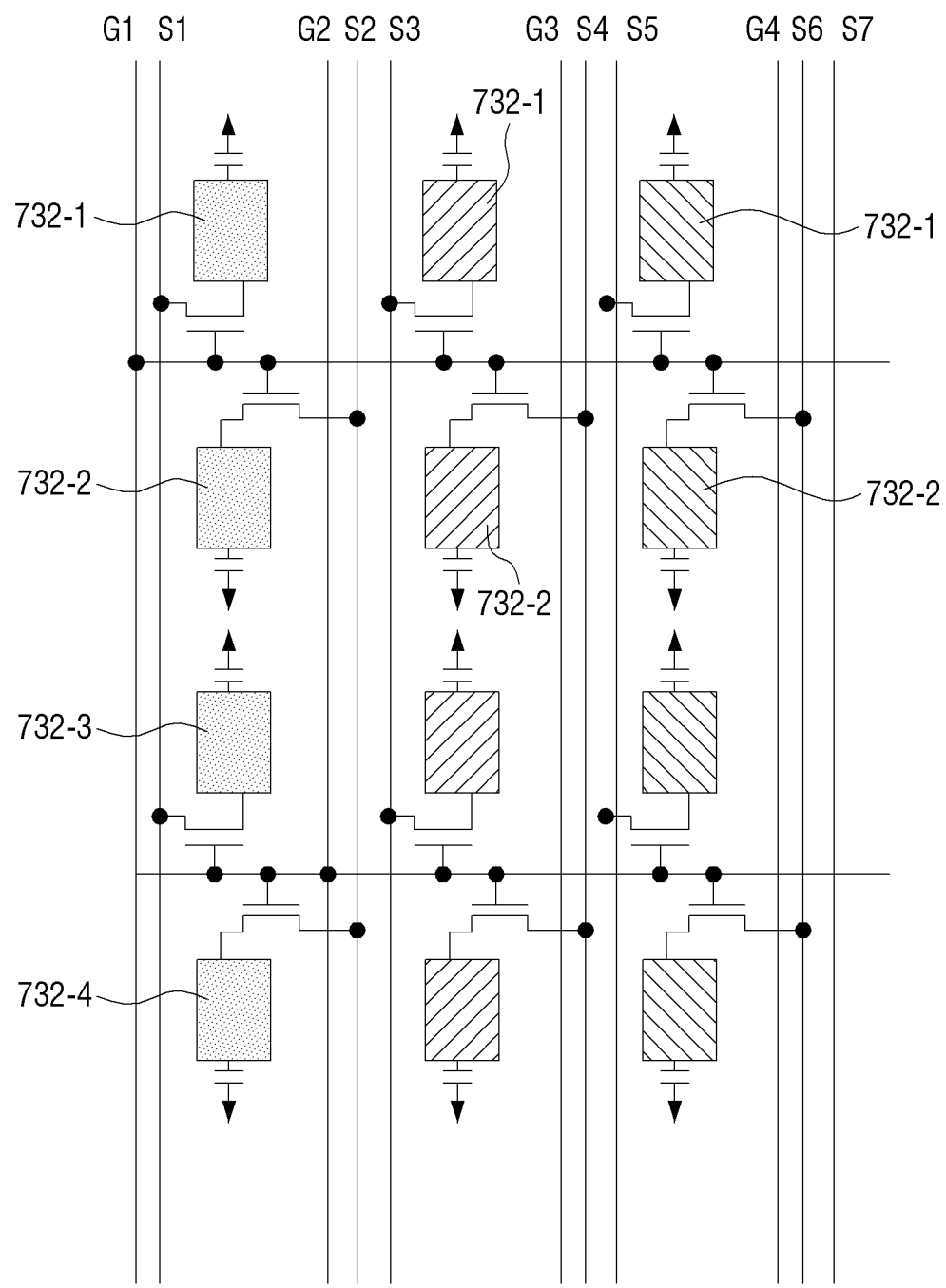
FIG. 16 is a view illustrating other example of connection of source lines and gate lines in a three-side bezelless LCD panel, according to an exemplary embodiment.

Another example is that the source drive integrated circuit and the gate drive integrated circuit are connected with the plurality of liquid crystal pixels 732-1, 732-2, 732-3, and 732-4 as illustrated in FIG. 16. In detail, a plurality of gate lines G1, G2, G3, and G4 which are wired horizontally and connect the gate drive integrated circuit and the plurality of liquid crystal pixels 732-1, 732-2, 732-3, and 732-4 are sequentially electrically connected to the upper part through connection lines. Here, the gate lines have a structure in which one gate line is disposed between two lines of liquid crystal pixels 732-1 and 732-2 arranged in a horizontal direction, and are different from the above-described example in which one gate line is disposed for one line of liquid crystal pixels. Also, a plurality of source lines S1, S2, S3, S4, and S5 to electrically connect the source drive integrated circuit and the plurality of liquid crystal pixels 732-1, 732-2, 732-3, and 732-4 are vertically wired. Accordingly, if one of the gate lines (for example, G1) is turned on, two lines of liquid crystal pixels 732-1 and 732-2 connected to this gate line G1 are activated. When the gate line is wired in this structure, an operation speed of the LCD panel may be fast.

Hereinafter, a method for connecting bezelless LCD apparatuses according to an exemplary embodiment will be explained in detail with reference to FIGS. 17A and 17B.

Figure 17A:
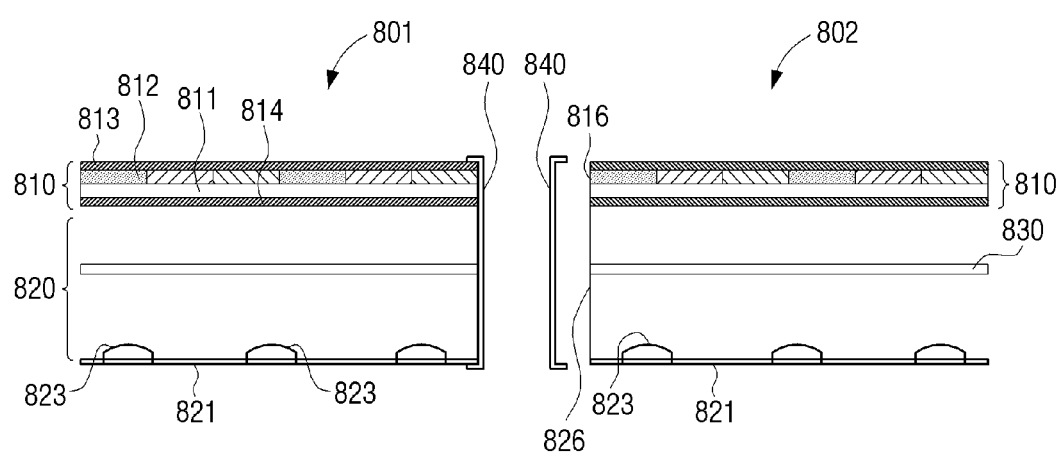
FIG. 17A is a cross-sectional view schematically illustrating a state before two bezelless LCD apparatuses are connected, according to an exemplary embodiment.
Figure 17B:
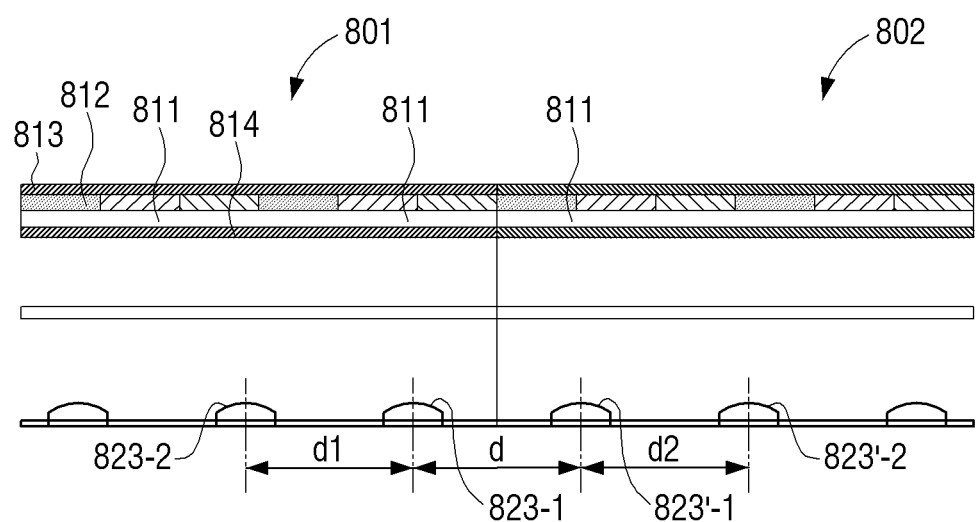
FIG. 17B is a cross-sectional view schematically illustrating a state in which two bezelless LCD apparatuses are connected, according to an exemplary embodiment.

FIG. 17A is a cross-sectional view schematically illustrating a state before two bezelless LCD apparatuses are connected, and FIG. 17B is a cross-sectional view schematically illustrating a state in which two bezelless LCD apparatuses are connected.

A bezelless LCD panel 810 is combined with a backlight unit 820 disposed below the bezelless LCD panel 810 to form a bezelless LCD apparatus 801 and 802. The backlight unit 820, as illustrated in FIG. 17A, includes a plurality of LEDs 823 which are provided at equal intervals on a bottom plate 821 of the backlight unit 820. A diffuser plate 830 is disposed above the LEDs 823 of the backlight unit 820. An inner surface of the bottom plate 821 of the backlight unit 820 on which the LEDs 823 are disposed is formed as a reflecting plate, and is formed such that light is not leaked through the rear surface of the backlight unit 820. The bezelless LCD panel 810 is disposed above the diffuser plate 830 of the backlight unit 820. A cover 840 is detachably disposed on a side 816 of the bezelless LCD panel 810 from which the liquid crystal pixels are exposed and a side 826 of the backlight unit 820 corresponding to the side 816 of the bezelless LCD panel 810. The cover 840 is formed of rubber, plastics, metal, etc., and is formed in a shape that can be easily taken off from the side of the bezelless LCD apparatus 801 and 802 from which the liquid crystal pixels are exposed. In FIG. 17A, the right bezelless LCD apparatus 801 is a state in which the cover 840 is separated from the side 816 from which the liquid crystal pixels are exposed.

A single side bezelless LCD apparatus in which a single side bezelless LCD panel is disposed is provided with a cover that can cover one side from which liquid crystal pixels are exposed. A two-side bezelless LCD apparatus in which a two-side bezelless LCD panel is disposed is provided with a cover that can cover two sides from which liquid crystal pixels are exposed. A three-side bezelless LCD apparatus in which a three-side bezelless LCD panel is disposed is provided with a cover that can cover three sides from which liquid crystal pixels are exposed.

When connecting two single side bezelless LCD apparatuses 801 and 802, the cover 840 is taken off, and then, as illustrated in FIG. 17B, the sides 816 from which the cover 840 was removed are brought into contact with each other. When the two bezelless LCD apparatuses 801 and 802 are connected in this way, the two LCD panels 810 are continuously connected without the bezel therebetween to implement a seamless wide screen. Here, a distance d between two outmost LEDs 823-1 and 823'-1 of the two bezelless LCD apparatuses 801 and 802 connected to each other is the same as each of a distance d1 between LEDs 823-1 and 823-2 of the first bezelless LCD apparatus 801 and a distance d2 between LEDs 823'-1 and 823'-2 of the second bezelless LCD apparatus 802. In other words, d=d1=d2. Therefore, the liquid crystal pixels of the connected portion may be supplied with the same amount of light as that supplied to the liquid crystal pixels of other portions.

In the above description, a method for connecting the two bezelless LCD apparatuses 801 and 802 by bringing the sides of the two bezelless LCD apparatuses 801 and 802 from which the liquid crystal pixels are exposed into contact with each other was described. However, the method for connecting the bezelless LCD apparatuses is not limited thereto. The two bezelless LCD apparatuses may be connected in a structure in which the bezelless LCD panels overlap each other.

Hereinafter, a structure for connecting two bezelless LCD apparatuses by overlapping two bezelless LCD panels will be described with reference to FIGS. 18 to 25. In FIGS. 18 to 25, the bezelless LCD panel 810 is indicated to be very thick, but the thickness of the actual LCD panel 810 is about 1 mm or less so that the two LCD panels 810 can be connected by overlapping them. Accordingly, in FIGS. 18 to 25, connection relationships of the bezelless LCD panel 810 and the backlight unit 820 are conceptually illustrated.

Figure 18:
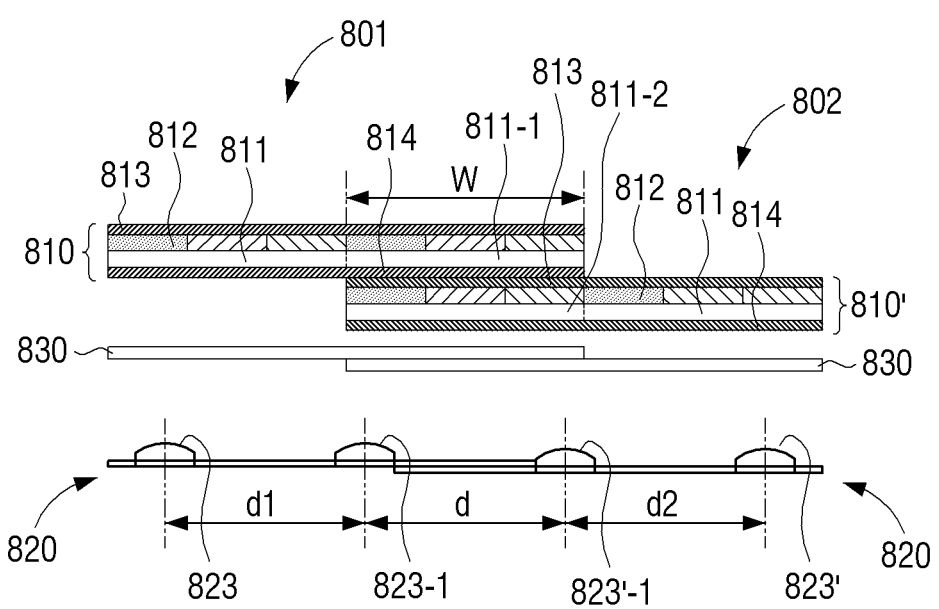
FIGS. 18 to 25 are cross-sectional views schematically illustrating various connection structures in which two bezelless LCD apparatuses are connected, according to exemplary embodiments.

FIG. 18 illustrates a connection structure in which exposed liquid crystal pixel lines 811-1 and 811-2 of two bezelless LCD panels 810 and 810', namely, the outmost liquid crystal pixel lines overlap with each other. Here, the second bezelless LCD panel 810' is disposed below the first bezelless LCD panel 810. The second bezelless LCD panel 810' is inserted under the first bezelless LCD panel 810 by a width w of one liquid crystal pixel 811-1, and a lower polarization member 814 of the first bezelless LCD panel 810 is in contact with or adjacent to an upper polarization member 813 of the second bezelless LCD panel 810'. Here, since a distance d between two outmost LEDs 823-1 and 823'-1 of the two bezelless LCD apparatuses 801 and 802 connected to each other is the same as each of a distance d1 between LEDs 823 and 823-1 of the first bezelless LCD apparatus 801 and a distance d2 between LEDs 823' and 823'-1 of the second bezelless LCD apparatus 802 (namely, d=d1=d2), the liquid crystal pixels of the connected portion may be supplied with the same amount of light as that supplied to the liquid crystal pixels of other portions.

Figure 19:
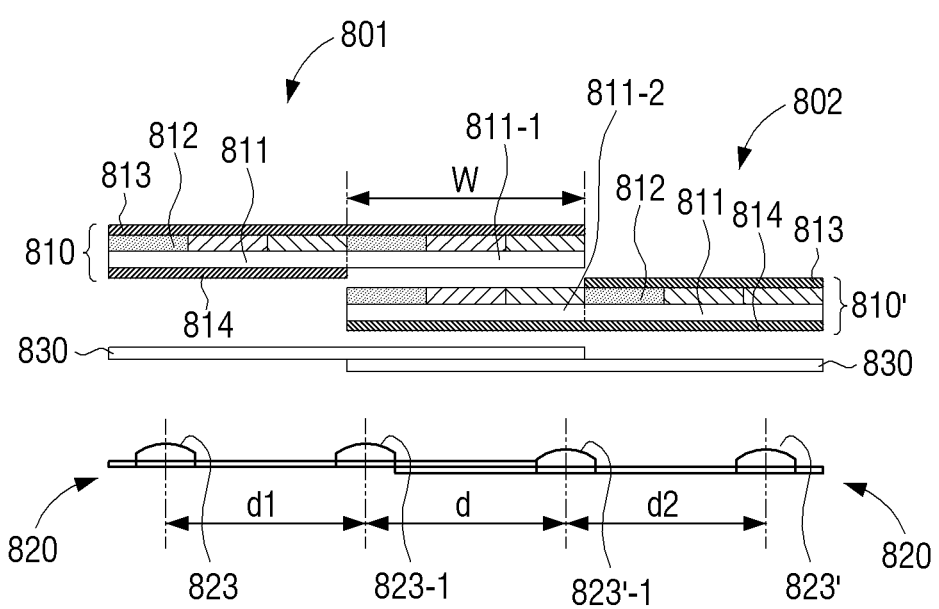

FIG. 19 illustrates a connection structure in which the exposed liquid crystal pixel lines 811-1 and 811-2 of the two bezelless LCD panels 810 and 810', namely, the outmost liquid crystal pixel lines 811-1 and 811-2 overlap with each other. Here, the first bezelless LCD panel 810 is a state in which a portion of the lower polarization member 814 corresponding to the outmost liquid crystal pixel line 811-1 is removed, and the second bezelless LCD panel 810' is a state in which a portion of the upper polarization member 813 corresponding to the outmost liquid crystal pixel line 811-2 is removed. Accordingly, when the second bezelless LCD panel 810' is inserted under the first bezelless LCD panel 810 by the width w of one liquid crystal pixel, the liquid crystal layer 811 of the first bezelless LCD panel 810 is in contact with or adjacent to the color filter 812 of the second bezelless LCD panel 810'. Here, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the LEDs 823' and 823'-1 of the second bezelless LCD apparatus 802. In other words, d=d1=d2.

Figure 20:
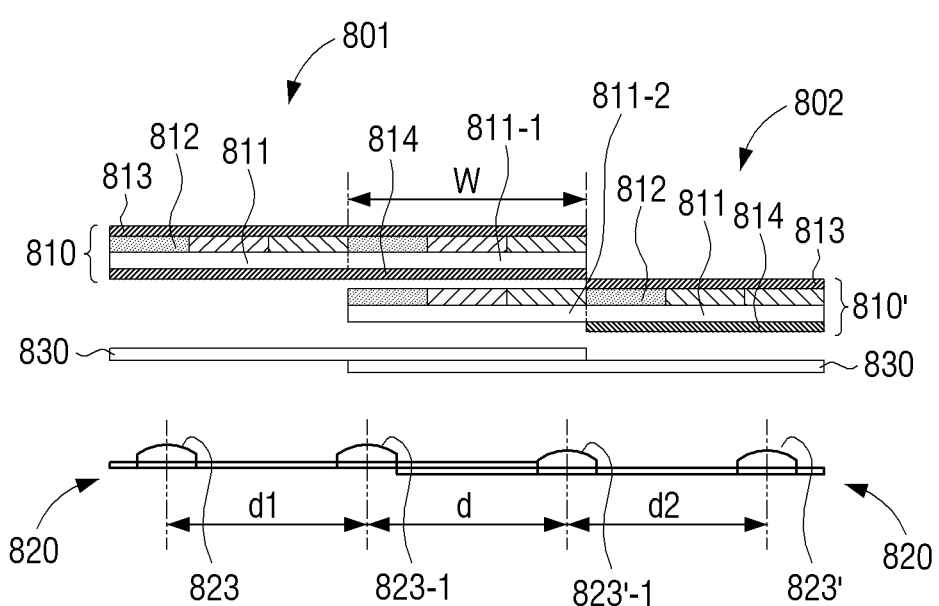

FIG. 20 illustrates a connection structure in which the exposed liquid crystal pixel lines 811-1 and 811-2 of the two bezelless LCD panels 810 and 810', namely, the outmost liquid crystal pixel lines 811-1 and 811-2 overlap with each other. Here, the second bezelless LCD panel 810' is a state in which portions of the upper and lower polarization members 813 and 814 corresponding to the outmost liquid crystal pixel line 811-2 are removed. Accordingly, when the second bezelless LCD panel 810' is inserted under the first bezelless LCD panel 810 by the width w of one liquid crystal pixel, the lower polarization member 814 of the first bezelless LCD panel 810 is in contact with or adjacent to the color filter 812 of the second bezelless LCD panel 810'. Here, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the light emitting diodes 823' and 823'-1 of the second bezelless LCD apparatus 802. In other words, d=d1=d2.

Figure 21:
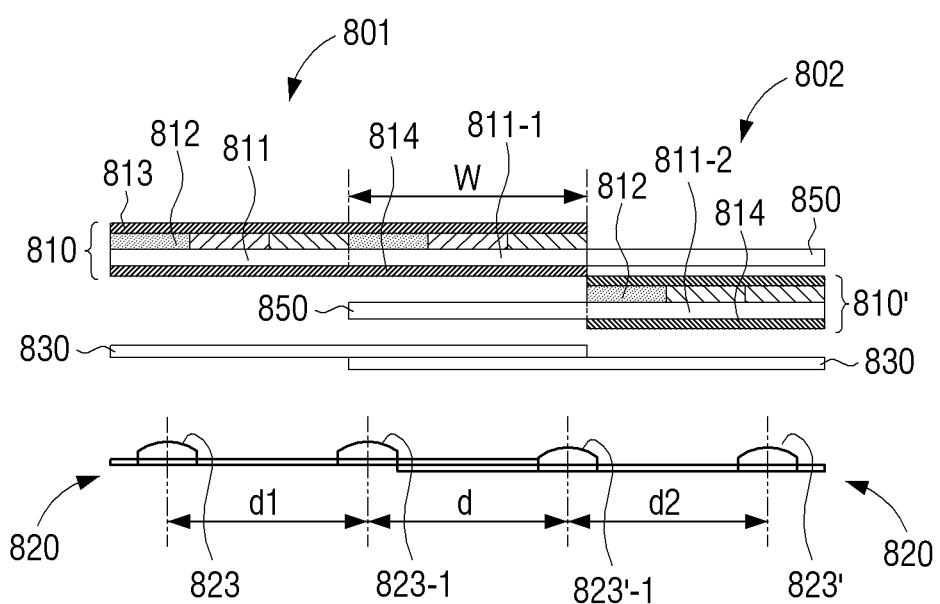

FIG. 21 illustrates a connection structure in which a dummy panel 850 disposed on a side of each of two bezelless LCD panels 810 and 810' from which the liquid crystal pixels are exposed and the outmost liquid crystal pixel lines 811-1 and 811-2 overlap with each other. Here, the dummy panel 850 is formed on a side of each of the outmost liquid crystal pixel lines 811-1 and 811-2 and formed of a transparent material to seal the exposed liquid crystal pixels. In FIG. 21, although the width of the dummy panel 850 is shown by the size corresponding to the width w of one liquid crystal pixel, the width of the dummy panel 850 is not limited thereto. The dummy panel 850 may be formed larger or smaller than the width of the liquid crystal pixel as long as it can seal each of the outmost liquid crystal pixel lines 811-1 and 811-2. Accordingly, the dummy panel 850 of the second bezelless LCD panel 810' is inserted under the first bezelless LCD panel 810. Here, the second bezelless LCD panel 810' is inserted until the end of the outmost liquid crystal pixel line 811-2 of the second bezelless LCD panel 810' is aligned with the end of the outmost liquid crystal pixel line 811-1 of the first bezelless LCD panel 810. In this case, since the dummy panel 850 which is placed above the outmost liquid crystal pixel line 811-2 of the second bezelless LCD panel 810' is transparent, a user can see an image output from the outmost liquid crystal pixel line 811-2 of the second bezelless LCD panel 810'. Also, the distance d between the outmost light emitting diodes 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the LEDs 823' and 823'-1 of the second bezelless LCD apparatus 802. In other words, d=d1=d2. In FIG. 21, the dummy panels 850 are indicated as being protruded only from the liquid crystal pixel lines 811-1 and 811-2 of the first and second bezelless LCD panels 810 and 810', respectively. According to another exemplary embodiment, however, the dummy panels 850 may be formed at sides of the lower polarization member 814 and the upper polarization member 813 of the first and second bezelless LCD panels 810 and 810', respectively. Also, according to still another exemplary embodiment, the dummy panels 850 may be formed at sides of the lower polarization member 814 and liquid crystal pixel line 811-1, and the upper polarization member 813, color filter 812 and liquid crystal pixel lines 811-2 of the first and second bezelless LCD panels 810 and 810', respectively.

Figure 22:
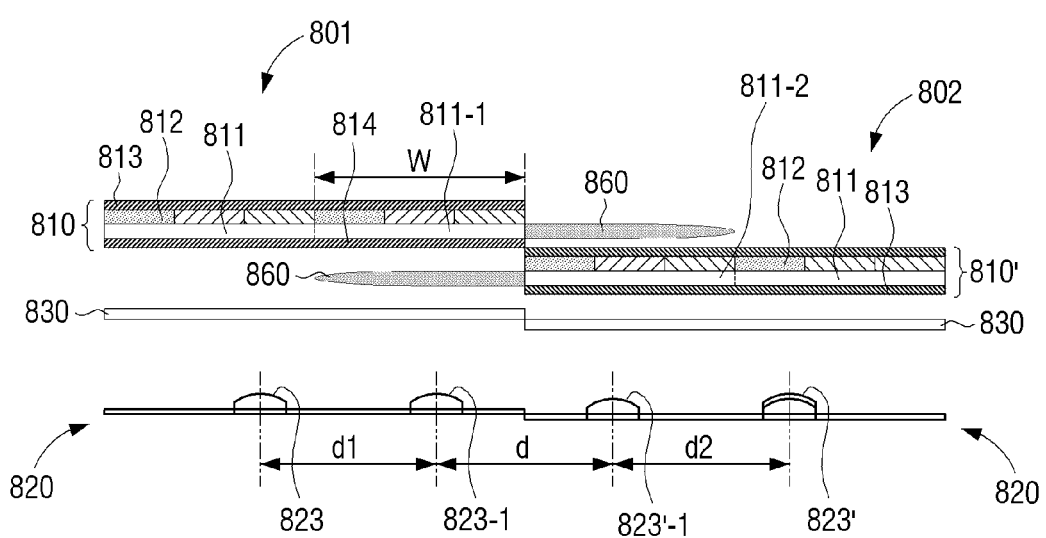

FIG. 22 illustrates a connection structure in which a sealing part 860 disposed on the side of each of two bezelless LCD panels 810 and 810' from which the liquid crystal pixels are exposed and the outmost liquid crystal pixel lines 811-1 and 811-2 overlap with each other. Here, the sealing part 860 is referred to a part sealing the exposed side surface of the outmost liquid crystal pixel line 811-1 and 811-2 by a transparent sealant to seal the exposed liquid crystal pixels. In FIG. 22, although the width of the sealing part 860 is shown by the size corresponding to the width w of one liquid crystal pixel, the width of the sealing part 860 is not limited thereto. The sealing part 860 may be formed larger or smaller than the width of the liquid crystal pixel as long as it can seal each of the outmost liquid crystal pixel lines 811-1 and 811-2. The sealing part 860 of the second bezelless LCD panel 810' is inserted under the first bezelless LCD panel 810. Here, the second bezelless LCD panel 810' is inserted until the end of the outmost liquid crystal pixel line 811-2 of the second bezelless LCD panel 810' is aligned with the end of the outmost liquid crystal pixel line 811-1 of the first bezelless LCD panel 810. In this case, since the sealing part 860 which is placed above the outmost liquid crystal pixel line 811-2 of the second bezelless LCD panel 810' is transparent, a user can see an image output from the outmost liquid crystal pixel line 811-2 of the second bezelless LCD panel 810'. Also, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the light emitting diodes 823' and 823'-1 of the second bezelless LCD apparatus 802. In other words, d=d1=d2.

Figure 23:
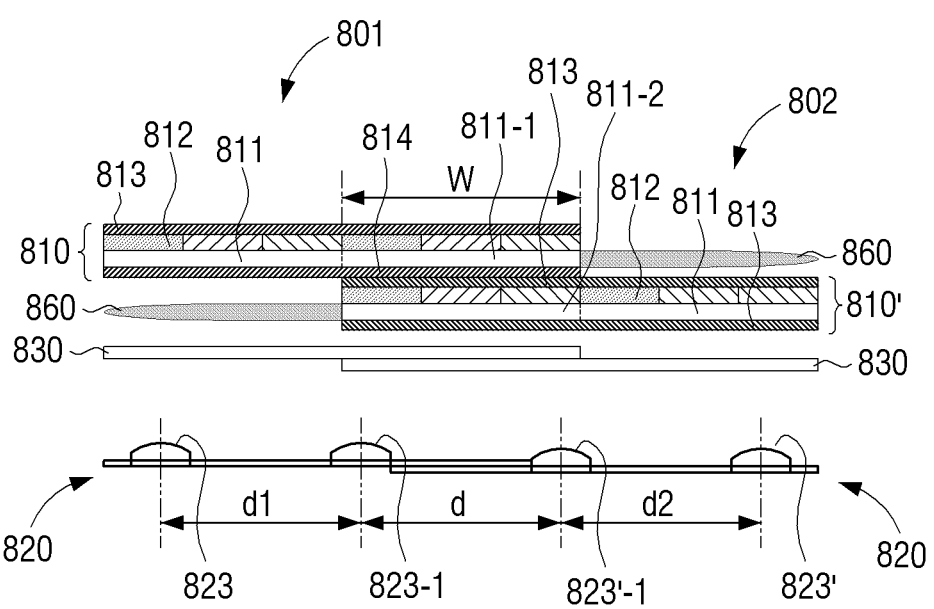

FIG. 23 illustrates a connection structure which is similar to the connection structure of the bezelless LCD apparatuses 801 and 802 as illustrated in FIG. 22, but in which the inserting depth of the second bezelless LCD panel 810' is different from that of FIG. 22. In detail, in FIG. 22, the outmost liquid crystal pixel lines 811-1 and 811-2 of the two bezelless LCD panels 810 and 810' do not overlap with each other, but, in FIG. 23, the second bezelless LCD panel 810' is inserted under the first bezelless LCD panel 810 in order that the outmost liquid crystal pixel lines 811-1 and 811-2 of the two bezelless LCD panels 810 and 810' overlap each other. Accordingly, the sealing part 860 of the first bezelless LCD panel 810 is placed above the inside liquid crystal pixel line of the second bezelless LCD panel 810', and the sealing part 860 of the second bezelless LCD panel 810' is placed under the inside liquid crystal pixel line of the first bezelless LCD panel 810. Also, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the LEDs 823' and 823'-1 of the second bezelless LCD apparatus 802. In other words, d=d1=d2.

Figure 24:
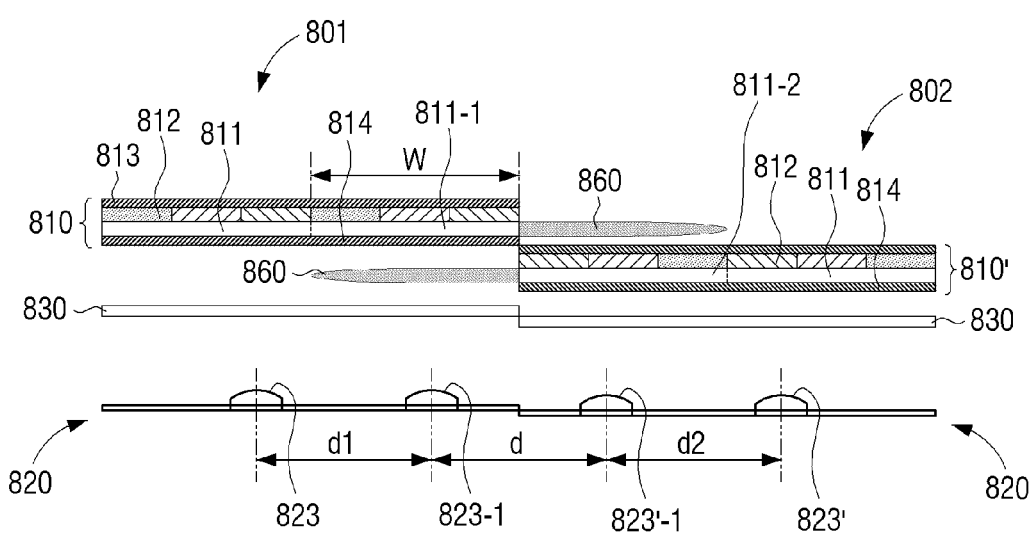

FIG. 24 illustrates a connection structure which is similar to the connection structure of the bezelless LCD apparatuses 801 and 802 as illustrated in FIG. 22, but in which arrangement of the second bezelless LCD panel 810' is different from that of FIG. 22. In detail, the second bezelless LCD panel 810' is a state in which the first bezelless LCD panel 810 is rotated by 180 degrees. Thus, as illustrated in FIG. 24, the arrangement order of red pixels, green pixels, and blue pixels configuring the outmost liquid crystal pixel line 811-1 and 811-2 of each of the two bezelless LCD panels 810 and 810' becomes the same. For example, if the arrangement of RGB pixels of the outmost liquid crystal pixel line 811-1 of the first bezelless LCD panel 810 is the order of red, green, and blue colors, the arrangement of RGB pixels of the outmost liquid crystal pixel line 811-2 of the first bezelless LCD panel 810' is also the order of red, green, and blue colors.

Here, the sealing part 860 of the second bezelless LCD panel 810' is inserted under the first bezelless LCD panel 810. Also, the second bezelless LCD panel 810' is inserted until the end of the outmost liquid crystal pixel line 811-2 of the second bezelless LCD panel 810' is aligned with the end of the outmost liquid crystal pixel line 811-1 of the first bezelless LCD panel 810. Accordingly, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the LEDs 823' and 823'-1 of the second bezelless LCD apparatus 802. In other words, d=d1=d2.

Figure 25:
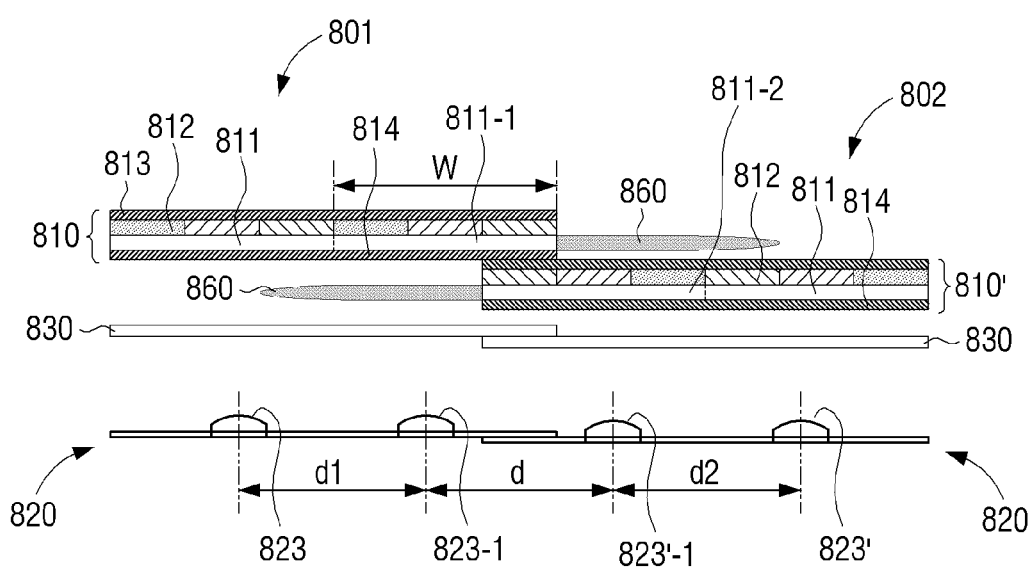

FIG. 25 illustrates a connection structure which is similar to the connection structure of the bezelless LCD apparatuses 801 and 802 as illustrated in FIG. 24, but in which the inserting depth of the second bezelless LCD panel 810' is different from that of FIG. 24. In detail, in FIG. 24, the outmost liquid crystal pixel lines 811-1 and 811-2 of the two bezelless LCD panels 810 and 810' do not overlap each other, but, in FIG. 25, the second bezelless LCD panel 810' is inserted under the first bezelless LCD panel 810 in order that the last pixels of the RGB pixels of the outmost liquid crystal pixel lines 811-1 and 811-2 of the two bezelless LCD panels 810 and 810' overlap each other. For example, if the last pixel of the RGB pixels of the outmost liquid crystal pixel lines 811-1 is a blue pixel, the second bezelless LCD panel 810' is inserted under the first bezelless LCD panel 810 in order that only the blue pixels of the outmost liquid crystal pixel lines 811-1 and 811-2 of the first and second bezelless LCD panels 810 and 810' overlap each other. Accordingly, the sealing part 860 of the first bezelless LCD panel 810 is placed above the second bezelless LCD panel 810', and the sealing part 860 of the second bezelless LCD panel 810' is placed below the first bezelless LCD panel 810. Also, the distance d between the outmost LEDs 823-1 and 823'-1 of the two bezelless LCD apparatuses 801 and 802 connected to each other is the same as each of the distance d1 between the LEDs 823 and 823-1 of the first bezelless LCD apparatus 801 and the distance d2 between the LEDs 823' and 823'-1 of the second bezelless LCD apparatus 802. In other words, d=d1=d2.

In the above, for describing the cases in which the two bezelless LCD apparatuses are connected, FIGS. 17A to 25 illustrate the bezelless LCD apparatuses using the direct type of backlight unit in which the LEDs are disposed directly below the LCD panel. However, alternatively, the present disclosure may be applied to bezelless LCD apparatuses using an edge type of backlight unit in which LEDs are disposed on the inner side of the backlight unit.

FIG. 10 describes a case of manufacturing the bezelless LCD panel 610' using the LCD panel 610 with the gate portions 611 and 612 on two sides thereof. When manufacturing a bezelless LCD panel by cutting a LCD panel, for increasing production efficiency, it is preferable, but not necessary, to cut only a same side of each of LCD panels and to produce required bezelless LCD panels by using them. For example, if right sides of all LCD panels are cut off, a bezelless LCD panel whose left side must be cut off can be made using a bezelless LCD panel whose right side is cut off. For this, a liquid crystal layer is rotated by 180 degrees. However, upper and lower polarization members attached to upper and lower surfaces of the liquid crystal layer are not rotated with the liquid crystal layer so that polarization component of light emitted from the LCD panel is the same.

Figure 26:
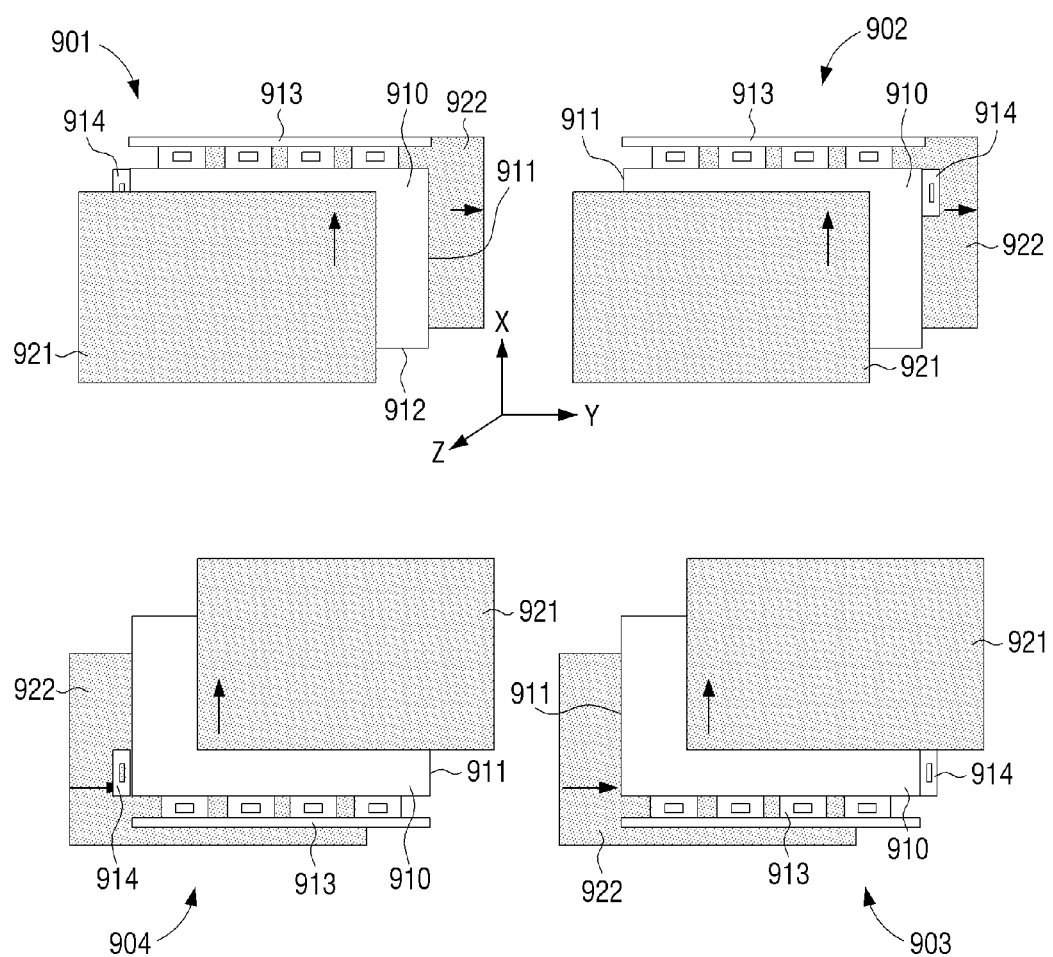
FIG. 26 is a view for explaining a method for forming a 2×2 tiled display by using bezelless LCD panels the same side of which is cut, according to an exemplary embodiment.

Hereinafter, a method for installing a 2×2 tiled display using bezelless LCD panels whose right side and bottom side are cut off will be described with reference to FIG. 26.

First, four two-side bezelless LCD panels 901 whose right side 911 and bottom side 912 are removed are provided.

A first bezelless LCD panel 901 uses a two-side bezelless LCD panel 901 whose right side 911 and bottom side 912 are removed. At this time, an upper polarization member 921 is configured to be capable of passing only light in a vertical direction, and a lower polarization member 922 is configured to be capable of passing only light in a horizontal direction. In FIG. 26, arrows indicate the direction of polarization.

A second bezelless LCD panel 902 is formed such that an upper polarization member 921 and a lower polarization member 922 of the two-side bezelless LCD panel 901 are kept in an original state and only a liquid crystal layer 910 is rotated by 180 degrees. In other words, the liquid crystal layer 910 is rotated about the axis X by 180 degrees so that a source part 913 is kept on an upper side thereof and a gate part 914 of the left side is located on the right side thereof. Then, the upper polarization member 921 and the lower polarization member 922 are attached to the upper and lower surfaces of the rotated liquid crystal layer 910, respectively. As a result, images to be displayed on the second bezelless LCD panel 902 are revered from side to side. Accordingly, when images reversed from side to side are input, the second bezelless LCD panel 902 displays images not reversed from side to side.

A third bezelless LCD panel 903 is formed to rotate the first bezelless LCD panel 901 about the axis Z by 180 degrees in the clockwise direction. In this case also, since images to be displayed on the third bezelless LCD panel 903 are revered from side to side, the third bezelless LCD panel 903 needs to receive images reversed from side to side.

A fourth bezelless LCD panel 904 is formed by rotating the second bezelless LCD panel 902 about the axis Z by 180 degrees in the clockwise direction after the second bezelless LCD panel 902 is made by using the first bezelless LCD panel 901. In this case, images displayed on the fourth bezelless LCD panel 904 are not reversed from side to side. Therefore, the fourth bezelless LCD panel 904 is not necessary to receive the images reversed from side to side unlike the second bezelless LCD panel 902.

According to the exemplary embodiments as described above, after making one type of bezelless LCD panel 901, which is used to make various types of bezelless LCD panels 902, 903, and 904, so there is an advantage that the manufacturing is easy.

Also, the bezelless LCD apparatus according to the above exemplary embodiments may include at least one position detecting sensor which is disposed on a rear surface of the bezelless LCD apparatus and can detect a position of other bezelless LCD apparatus to be connected for the convenience of connecting work.

Figure 27:
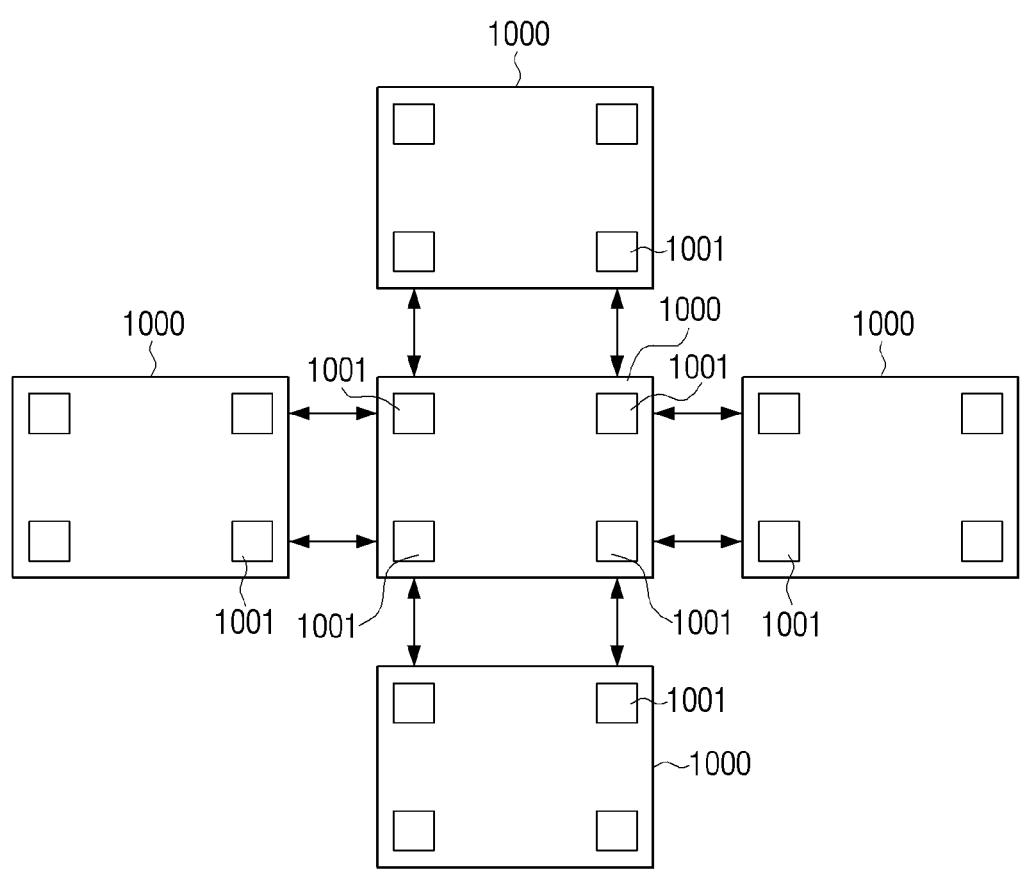
FIG. 27 is a view for explaining operation of position detecting sensors installed on a rear surface of a bezelless LCD apparatus, exemplary.

FIG. 27 is a view for explaining an operation of position detecting sensors installed on a rear surface of a bezelless LCD apparatus.

Referring to FIG. 27, four position detecting sensors 1001 may be disposed on four corners of a rear surface of the bezelless LCD apparatus 1000. The four position detecting sensors 1001 may detect different bezelless LCD apparatuses 1000 which are connected to the up, down, left, and right of the bezelless LCD apparatus 1000. Four position detecting sensors 1001 may be disposed on the rear surface of another bezelless LCD apparatus 1000, which is disposed around the bezelless LCD apparatus 1000. Accordingly, if infrared sensors or laser sensors are used as the position detecting sensors 1001, a position relationship between two bezelless LCD apparatuses 1000 to be connected with each other may be detected. While monitoring the position relationship between two bezelless LCD apparatuses 1000, in detail, the distances of the up and down, the left and right, and forward and backward directions outputting from the position detecting sensors 1001, a user can correctly connect the two bezelless LCD apparatuses 1000.

Figure 28:
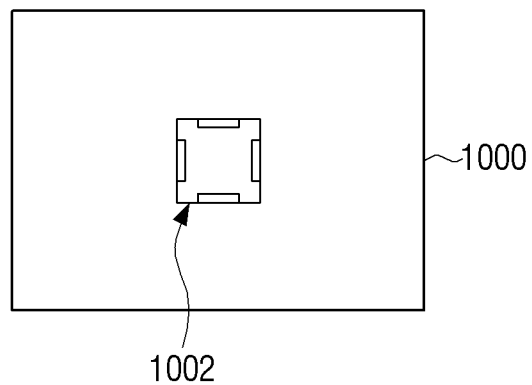
FIG. 28 is a view illustrating other example of a position detecting sensor installed on a rear surface of a bezelless LCD apparatus, according to an exemplary embodiment.

FIG. 27 illustrates the case in which the four position detecting sensors 1001 are disposed on the four corners of the rear surface of the bezelless LCD apparatus 1000. However, the position detecting sensors 1001 are not limited thereto. As another example, as illustrated in FIG. 28, a single position detecting sensor 1002 may be disposed on a center of the rear surface of the bezelless LCD apparatus 1000. In this case, the position detecting sensor 1002 disposed on the center is configured to detect positions of other bezelless LCD apparatuses 1000 to be connected by emitting infrared or laser in the up, down, left, and right directions.

Hereinafter, a method for connecting bezelless LCD apparatuses with position detecting sensors will be described with reference to FIGS. 29 and 30. Here, the bezelless LCD apparatus may be a flat television or a flat monitor.

Figure 29:
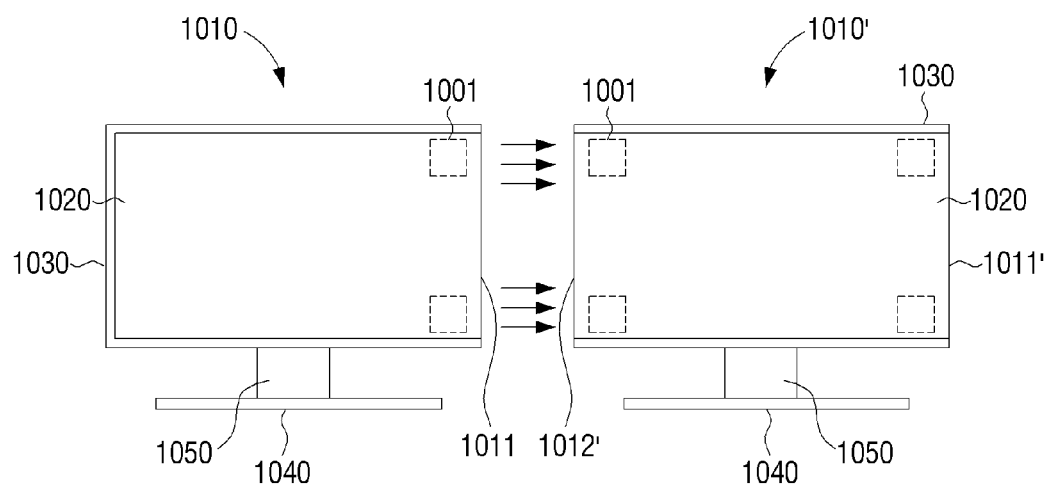
FIG. 29 is a view illustrating a bezelless LCD apparatus according to an exemplary embodiment.
Figure 30:
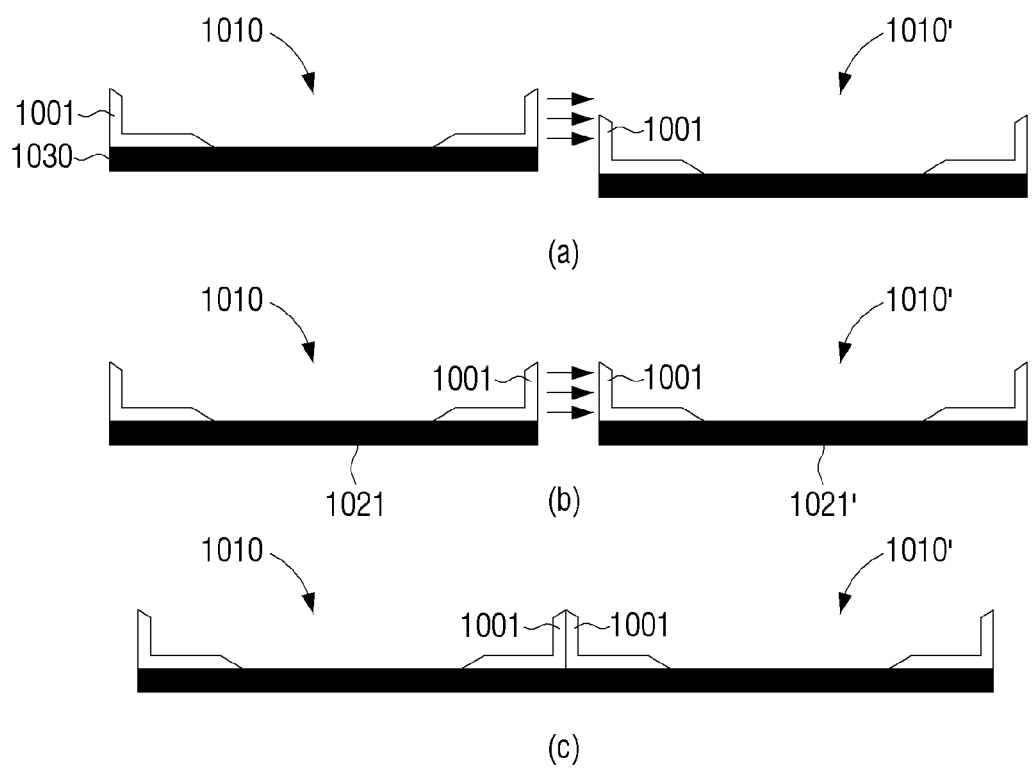
FIG. 30 is a view illustrating a process in which the two bezelless LCD apparatuses as illustrated in FIG. 29 are automatically connected, according to an exemplary embodiment.

FIG. 29 is a view illustrating bezelless v apparatuses provided with position detecting sensors according to an exemplary embodiment, and FIG. 30 is a view illustrating a process in which the two bezelless LCD apparatuses as illustrated in FIG. 29 are automatically connected.

A bezelless LCD apparatus 1010 includes a housing 1030 which supports and fixes a bezelless LCD panel 1020 and a backlight unit (not illustrated). Position detecting sensors 1001 to detect a position of another bezelless LCD apparatus 1010' to be connected to a left side or a right side of the bezelless LCD panel 1020 are disposed on a rear surface of the housing 1030. Further, a stand 1040 is disposed on a bottom side of the housing 1030, and supports the housing 1030 perpendicular to a flat surface, such as a desk, a floor, etc.

A moving unit 1050 which can move the housing 1030 may be disposed between the housing 1030 and the stand 1040. The moving unit 1050 is configured to allow the housing 1030 to move linearly in a front-rear direction, up-down direction, and/or left and right directions. Here, the front-rear direction refers to a direction perpendicular to the drawing in the FIG. 29. Alternatively, the moving unit 1050 may be configured to allow the housing 1030 to move in the front-rear direction, up-down direction, and/or left and right directions depending on a signal of the position detecting sensors 1001. The moving unit 1050 capable of moving the housing 1030 linearly in the front-rear direction, up-down direction, and/or left and right directions may be implemented by using a related art technology. Therefore, a detailed description thereof is omitted. Also, the bezelless LCD apparatuses 1010 and 1010' may include a controller (not illustrated) which controls the moving unit 1050 by using signals of position detecting sensors 1001 to move the housing 1030 in which the bezelless LCD panel 1020 is accommodated. The controller may output a connection pattern 1101 (see FIG. 31) for checking the connection status of the two bezelless LCD panels 1020 on screens of the LCD panels 1020. The controller may be formed integrally with or separately from a related art control unit which controls the bezelless LCD panel 1020 to output images.

In FIG. 29, the first bezelless LCD apparatus 1010 is a single side bezelless LCD apparatus whose right side 1011 is removed, and two position detecting sensors 1001 are disposed on the right side of the rear surface of the housing 1030. The second bezelless LCD apparatus 1010' is a two-side bezelless LCD apparatus whose left and right sides 1011' and 1012' are removed, and four position detecting sensors 1001 are disposed on the rear surface of the housing 1030.

When the two bezelless LCD apparatuses 1010 and 1010' are desired to be connected, a user places the two bezelless LCD apparatuses 1010 and 1010' at a certain interval as illustrated in FIG. 29. At this time, a distance between the two bezelless LCD apparatuses 1010 and 1010' may be less than a maximum distance by which the moving unit 1050 can move the housing 1030 in the left and right directions.

Thus, the controller of the first bezelless LCD apparatus 1010 detects the position of the second bezelless LCD apparatus 1010' by allowing the position detecting sensors 1001 to output infrared. When the second bezelless LCD apparatus 1010 is spaced apart a certain distance from the first bezelless LCD apparatus 1010 in the forward and right directions as illustrated in FIG. 30(a), the controller of the first bezelless LCD apparatus 1010 controls the moving unit 1050 to allow the housing 1030 of the first bezelless LCD apparatus 1010 to move in the forward direction so that the front surfaces 1021 and 1021' of the LCD panels of the first and second bezelless LCD apparatuses 1010 and 1010' are aligned with each other as illustrated in FIG. 30(b). After that, the controller controls the moving unit 1050 of the first bezelless LCD apparatus 1010 to allow the housing 1030 of the first bezelless LCD apparatus 1010 to move in the right direction so that the right side 1011 of the first bezelless LCD apparatus 1010 is brought into contact with the left side 1012' of the second bezelless LCD apparatus 1010'. Thus, as illustrated in FIG. 30(c), the two bezelless LCD apparatuses 1010 and 1010' are correctly connected with each other. In the above description, the first bezelless LCD apparatus 1010 is moved. However, the second bezelless LCD apparatus 1010' may be moved to connect the first and second bezelless LCD apparatuses 1010 and 1010'. Alternatively, both the first and second bezelless LCD apparatuses 1010 and 1010' may be moved to connect the first and second bezelless LCD apparatuses 1010 and 1010'.

In the above, a method for connecting the two bezelless LCD apparatuses 1010 and 1010' has been described. However, when connecting three bezelless LCD apparatuses, a third bezelless LCD apparatus (not illustrated) is placed at a side of the second bezelless LCD apparatus 1010', and then the housing of the third bezelless LCD apparatus is moved by using the position detecting sensors 1001 so that the third bezelless LCD apparatus can be connected to the second bezelless LCD apparatus 1010'.

In the above description, the two bezelless LCD apparatuses 1010 and 1010' are automatically connected. However, the two bezelless LCD apparatuses 1010 and 1010' may be manually connected. In this case, there is not the moving unit 1050 between the stand 1040 and the housing 1030.

In this case, the position detecting sensors 1001 detect the position of the second bezelless LCD apparatus 1010' based on the first bezelless LCD apparatus 1010, and the controller may tell a user by sound where to move the second bezelless LCD apparatus 1010' by using this sensor information. For example, the controller may tell by the sound "Please move the right bezelless LCD apparatus by 5 cm to the left from the current position."

Figure 31:
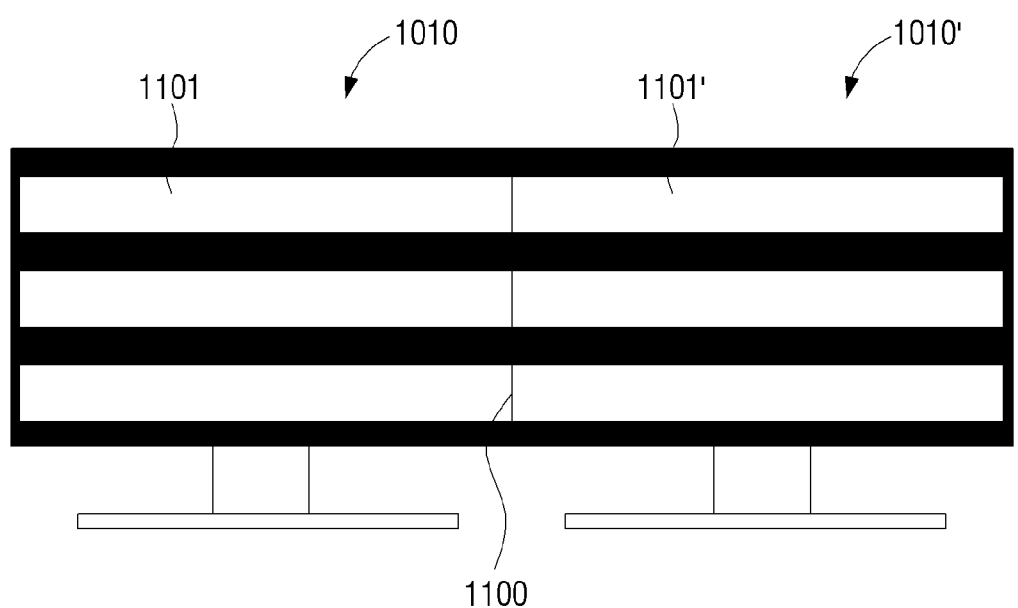
FIG. 31 is a view illustrating a connection pattern displayed on screens of the two bezelless LCD apparatuses as illustrated in FIG. 29, according to an exemplary embodiment.

After that, the controller outputs the connection patterns 1101 and 1101' as illustrated in FIG. 31 on the screens of the first and second bezelless LCD apparatus 1010 and 1010'. Thus, the user can more accurately connect the first and second bezelless LCD apparatuses 1010 and 1010' using the connection patterns 1101 and 1101'. The connection patterns 1101 and 1101' may be formed as several white straight lines drawn in the horizontal direction on a black background. Accordingly, if the first and second bezelless LCD apparatuses 1010 and 1010' are not connected correctly, the step difference occurs on a surface 1100 in which the connection patterns 1101 and 1101' are continued.

Figure 32:
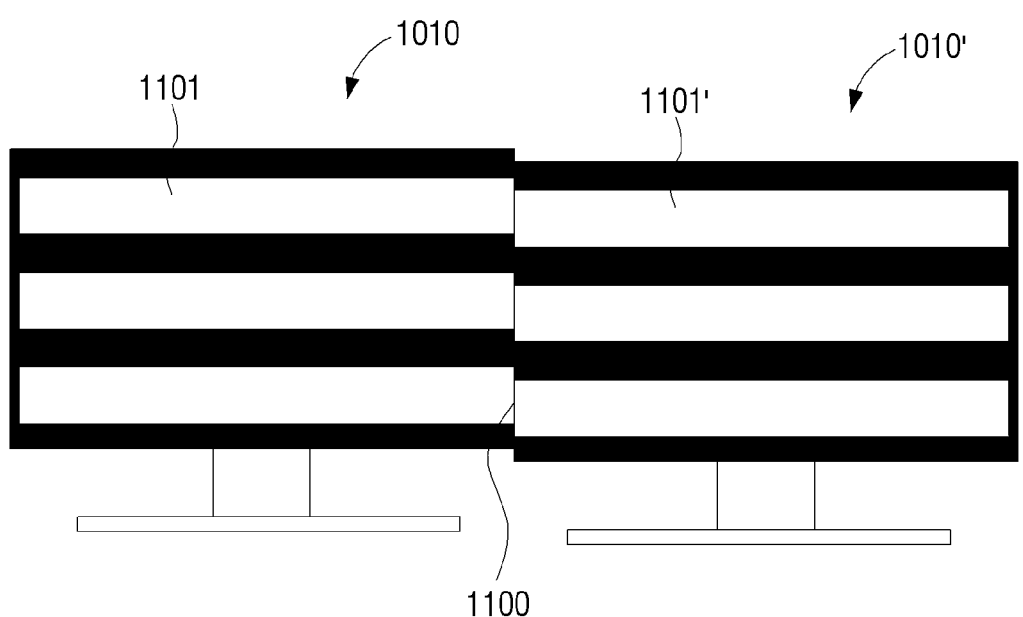
FIG. 32 is a view illustrating a state in which two bezelless LCD apparatuses are deviated in a vertical direction, according to an exemplary embodiment.

For example, when the user manually connects the first and second bezelless LCD apparatuses 1010 and 1010', if the connection is incorrect, as illustrated in FIG. 32, step difference occurs in the up-down direction between the connection patterns 1101 and 1101' being output on the screens of the first and second bezelless LCD apparatuses 1010 and 1010'. Accordingly, the user moves the first bezelless LCD apparatus 1010 or the second bezelless LCD apparatus 1010' so that the step difference between the connection patterns 1101 and 1101' disappears. When the two connection patterns 1101 and 1101' displayed on the first and second bezelless LCD apparatuses 1010 and 1010' form a straight line without step difference as illustrated in FIG. 31, the first and second bezelless LCD apparatuses 1010 and 1010' are correctly connected.

Figure 33:
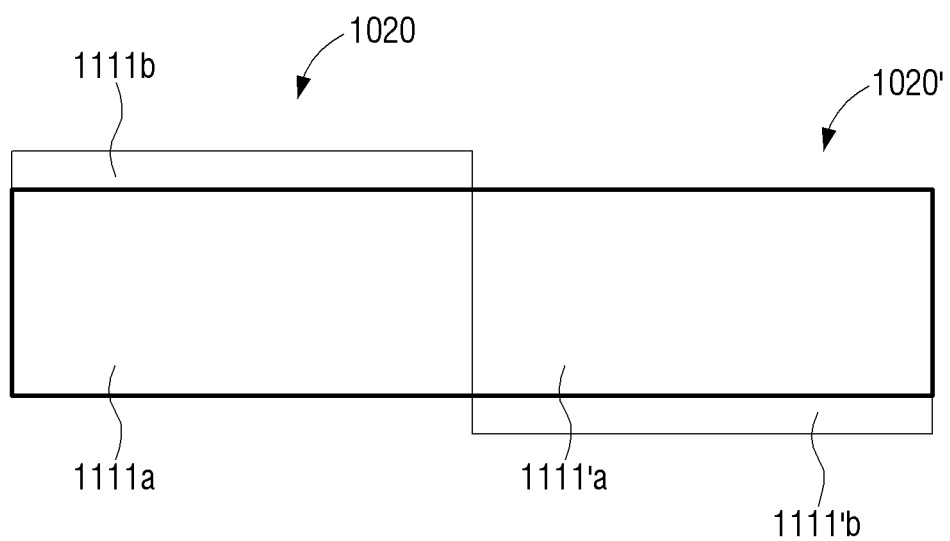
FIG. 33 is a view for explaining a method for displaying an image when two bezelless LCD apparatuses are deviated as illustrated in FIG. 32, according to an exemplary embodiment.

However, when the user does not correctly connect the first and second bezelless LCD apparatuses 1010 and 1010' like a state as illustrated in FIG. 31, but connects them in a state in which the first and second bezelless LCD apparatuses 1010 and 1010' are dislocated in the up-down direction as illustrated in FIG. 32, the controller of each of the first and second bezelless LCD apparatuses 1010 and 1010' may detect how much the first and second bezelless LCD apparatuses 1010 and 1010' are deviated from each other using the position detecting sensors 1001. Then, the controller may calculate the size of the pixels deviated in the LCD panels of the first and second bezelless LCD apparatuses 1010 and 1010' by using the detected amount of deviation. Accordingly, as illustrated in FIG. 33, the controller defines the pixel portions 1111b and 1111'b which are deviated in the LCD panels 1020 and 1020' of the first and second bezelless LCD apparatuses 1010 and 1010' as a region in which images are not displayed, and calculates only pixel portions 1111a and 1111'a which are connected to each other as an effective area in which the images can be displayed, thereby displaying the images thereon. As a result, even when the first and second bezelless LCD apparatuses 1010 and 1010' are not correctly connected, the user can view images without discontinuity.

While exemplary embodiments have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concept.

What is claimed is:

1. A tiled display comprising:
a plurality of bezelless liquid crystal display (LCD) panels in which pixels are exposed from at least one of a top side, a bottom side, a left side, and a right side of a corresponding bezelless LCD panel among the plurality of bezelless LCD panels; and
at least one backlight unit disposed below the plurality of bezelless LCD panels and configured to emit light,
wherein the plurality of bezelless LCD panels are disposed such that sides from which the pixels are exposed are connected to and in contact with each other, and an interval between the exposed pixels in contact with each other is equal to an interval between non-exposed pixels in contact with each other,
wherein the at least one backlight unit comprises a plurality of light emitting diodes (LEDs) configured to emit the light to the bezelless LCD panels, and
wherein the plurality of LEDs are disposed at equal intervals below the plurality of bezelless LCD panels including a portion where the plurality of bezelless LCD panels are connected to each other.

2. The tiled display of claim 1, wherein the plurality of bezelless LCD panels comprise at least one single side bezelless LCD panel from a left side or a right side of which pixels are exposed.

3. The tiled display of claim 2, wherein the single side bezelless LCD panel comprises a gate drive integrated circuit disposed on the right side or the left side of the single side bezelless LCD panel.

4. The tiled display of claim 2, wherein the single side bezelless LCD panel comprises a color filter with no black matrix on a left side or a right side thereof.

5. The tiled display of claim 1, the plurality of bezelless LCD panels comprise at least one two-side bezelless LCD panel from a left side and a right side of which pixels are exposed.

6. The tiled display of claim 5, wherein the two-side bezelless LCD panel comprises a gate drive integrated circuit and a source drive integrated circuit disposed on a top side and a bottom side of the two-side bezelless LCD panel.

7. The tiled display of claim 5, wherein the two-side bezelless LCD panel comprises a color filter with no black matrix on a left side and a right side thereof.

8. The tiled display of claim 1, wherein the plurality of bezelless LCD panels comprise at least one three-side bezelless LCD panel from three sides of which pixels are exposed.

9. The tiled display of claim 8, wherein the three-side bezelless LCD panel comprises a gate drive integrated circuit and a source drive integrated circuit disposed on a same side of the three-side bezelless LCD panel.

10. The tiled display of claim 8, wherein the three-side bezelless LCD panel is configured to activate one line of pixels or two lines of pixels by a single gate signal.

11. The tiled display of claim 1, wherein two adjacent bezelless LCD panels among the plurality of bezelless LCD panels are disposed such that respective sides of the two adjacent bezelless LCD panels from which pixels are exposed are in contact with each other.

12. The tiled display of claim 1, wherein two adjacent bezelless LCD panels among the plurality of bezelless LCD panels are disposed such that outmost pixel lines disposed in respective sides of the two adjacent bezelless LCD panels from which pixels are exposed overlap with each other.

13. The tiled display of claim 12, wherein an upper one of the two adjacent bezelless LCD panels comprises a lower polarization member whose portion corresponding to the overlapped pixel line is removed, and a lower one of the two adjacent bezelless LCD panels comprises an upper polarization member whose portion corresponding to the overlapped pixel line is removed.

14. The tiled display of claim 1, wherein each of the plurality of bezelless LCD panels further comprises a transparent dummy panel formed on a side from which pixels are exposed, and
wherein two adjacent bezelless LCD panels among the plurality of bezelless LCD panels are disposed such that the transparent dummy panel of one of the two adjacent bezelless LCD panels overlaps with an exposed pixel line of the other of the two adjacent bezelless LCD panels.

15. The tiled display of claim 1, wherein each of the plurality of bezelless LCD panels further comprises a transparent sealing part sealing a side from which pixels are exposed, and
wherein two adjacent bezelless LCD panels among the plurality of bezelless LCD panels are disposed such that the transparent sealing part of one of the two adjacent bezelless LCD panels overlaps with an exposed pixel line of the other of the two adjacent bezelless LCD panels.

16. The tiled display of claim 1, wherein each of the plurality of bezelless LCD panels further comprises at least one position detecting sensor configured to detect a position relationship of an adjacent bezelless LCD panel.

17. The tiled display of claim 1, wherein the plurality of bezelless LCD panels comprise at least one single side bezelless LCD panel from a left side or a right side of which pixels are exposed, and
wherein the single side bezelless LCD panel is formed by removing one of two gate portions provided on two sides of an LCD panel.

18. A bezelless liquid crystal display (LCD) apparatus comprising:
a bezelless LCD panel configured such that pixels are exposed from at least one of a left side and a right side thereof; and
at least one position detecting sensor configured to detect a position of another bezelless LCD panel to be disposed at a left or a right of the bezelless LCD panel,
wherein the pixels exposed from at least one of the left side and the right side of the bezelless LCD panel are in contact with pixels exposed from at least one of a left side and a right side of the other bezelless LCD panel so that an interval between the exposed pixels in contact with each other is equal to an interval between non-exposed pixel in contact with each other.

19. The bezelless LCD apparatus of claim 18, further comprising:
a backlight unit disposed below the bezelless LCD panel and configured to emit light;
a housing supporting the bezelless LCD panel and the backlight unit; and
a stand supporting the housing.

20. The bezelless LCD apparatus of claim 19, further comprising a moving unit disposed in the stand and configured to move the housing in vertical and horizontal directions,
wherein the moving unit is configured to move the housing depending on a signal of the position detecting sensor.

* * * * *